US007715981B2

(12) United States Patent
Bradley et al.

(10) Patent No.: US 7,715,981 B2
(45) Date of Patent: May 11, 2010

(54) SYSTEM, METHOD AND COMPUTER PROGRAM PRODUCT FOR SEARCHING AND RETRIEVING RANKED POINTS OF INTEREST WITHIN A POLYGONAL AREA OF INTEREST

(75) Inventors: Lance P. Bradley, Keller, TX (US); Summer Hahne, Beford, TX (US); Richard Chesworth, Flower Mound, TX (US); Richard J. Drexel, III, Bedford, TX (US); Chris Gawronski, North Richland Hills, TX (US); Ashima Kulshreshtha, Grapevine, TX (US); Jared McPherson, Keller, TX (US); Chris Miller, Arlington, TX (US); Shylaja Nagenhalli, Carollton, TX (US); Minaxi H. Shukla, Keller, TX (US)

(73) Assignee: Travelocity.com LP, Southlake, TX (US)

( * ) Notice: Subject to any disclaimer, the term of this patent is extended or adjusted under 35 U.S.C. 154(b) by 1074 days.

(21) Appl. No.: 11/236,016

(22) Filed: Sep. 27, 2005

(65) Prior Publication Data

US 2006/0069504 A1 Mar. 30, 2006

Related U.S. Application Data

(60) Provisional application No. 60/613,345, filed on Sep. 27, 2004.

(51) Int. Cl.
*G01C 21/30* (2006.01)
(52) U.S. Cl. .................. 701/209; 701/208; 340/995.18
(58) Field of Classification Search ......... 701/207–213; 345/661, 855, 839, 854, 619, 660, 853; 707/504, 707/104.1, 526, 517; 340/990, 995.1–995.19
See application file for complete search history.

(56) References Cited

U.S. PATENT DOCUMENTS

| 5,559,707 A | 9/1996 | DeLorme et al. |
| 5,802,492 A | 9/1998 | DeLorme et al. |
| 5,893,093 A | 4/1999 | Wills |
| 5,948,040 A | 9/1999 | DeLorme et al. |

(Continued)

FOREIGN PATENT DOCUMENTS

| DE | 101 22 062 A1 | 11/2003 |
| WO | WO 01/63479 A | 8/2001 |
| WO | WO 03/062753 A | 7/2003 |
| WO | WO 03/081388 A | 10/2003 |

OTHER PUBLICATIONS

Nelson M. Mattos, Kathryn Zeidenstein; *Integrating Spatial Data with Business Data*; DB2 Magazine; 1999; 6 pages; XP-002288190.
Harry Niedzwiadek; "*OGC OpenLS Platform*;" Open GIS Consortium, Inc.; Dec. 20, 2002.
About Whereonearth —Core Competencies and Functionality.
L-Sphere-Core Components —GeoProx; http://www.whereonearth.com/geoprox; Aug. 2, 2004.

*Primary Examiner*—Richard M. Camby
(74) *Attorney, Agent, or Firm*—Alston & Bird LLP

(57) ABSTRACT

A method of searching and retrieving ranked points of interest (POIs) within a Polygonal area of interest (AOI) includes defining an AOI. The AOI has a Polygon shape and includes a plurality of points. The method also includes identifying at least one POI within the defined AOI, and organizing the identified POIs in an order of rankings associated with the identified POIs. Then, information related to the identified POIs is requested, and presented in the order of the rankings associated with the respective POIs.

27 Claims, 24 Drawing Sheets

U.S. PATENT DOCUMENTS

| | | |
|---|---|---|
| 6,202,065 B1 | 3/2001 | Wills |
| 6,321,158 B1 | 11/2001 | DeLorme et al. |
| 6,732,120 B1 | 5/2004 | Du |
| 6,847,888 B2 * | 1/2005 | Fox et al. .................... 701/208 |
| 7,139,770 B2 * | 11/2006 | Nakase et al. ............... 707/102 |
| 2003/0120650 A1 | 6/2003 | Wills |
| 2003/0220734 A1 | 11/2003 | Harrison et al. |
| 2004/0073538 A1 | 4/2004 | Leishman et al. |

* cited by examiner

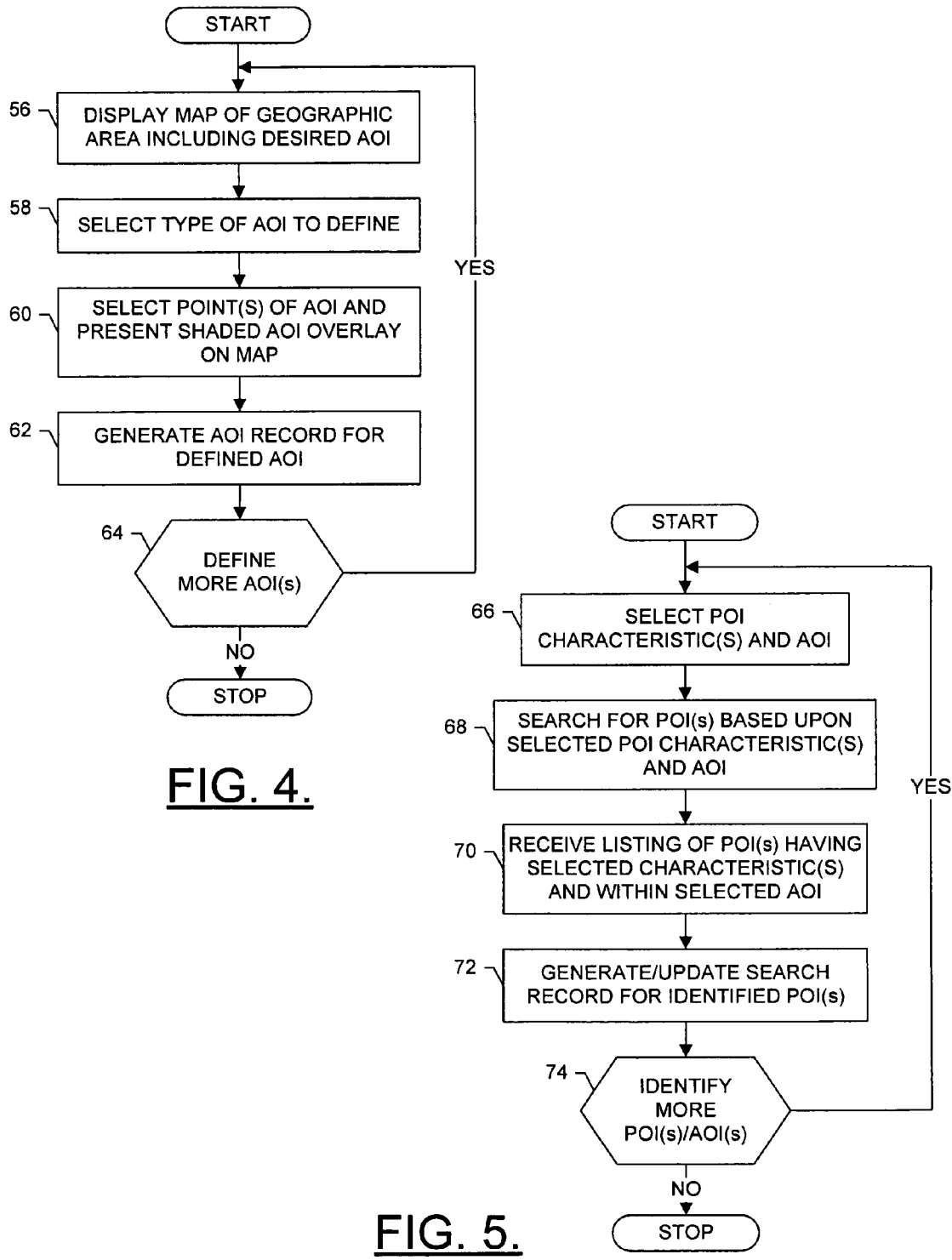

FIG. 21.

SYSTEM, METHOD AND COMPUTER PROGRAM PRODUCT FOR SEARCHING AND RETRIEVING RANKED POINTS OF INTEREST WITHIN A POLYGONAL AREA OF INTEREST

CROSS-REFERENCE TO RELATED APPLICATIONS

The present application claims priority from U.S. Provisional Patent Application No. 60/613,345, entitled: System, Method and Computer Program Product for Searching and Retrieving Ranked Points of Interest within A Polygonal Area of Interest, filed on Sep. 27, 2004, the content of which is incorporated herein by reference in its entirety.

FIELD OF THE INVENTION

The present invention generally relates to systems and methods for searching for one or more points of interest (POIs) within an area of interest (AOI), and more particularly relates to systems and methods for searching for POI(s) within a predefined polygonal AOI, the POI(s) being ranked within a characteristic category.

BACKGROUND OF THE INVENTION

Location-based services, such as computerized searching for information related to places or points of interest (POIs) located within a specific area of interest (AOI) are provided in a number of different industries, including the travel services industry. Conventionally, such services permit a user to search for POIs located within a specified radial distance from a specified geographic point, the radial distance and geographic point defining a circular AOI. For example, a user desiring to search for information related to hotels within the metro-Dallas, Tex. area may request information related to hotels within fifteen miles of Dallas, Tex. (the specification of Dallas, Tex. interpreted as the geometric center point of the city of Dallas, Tex.).

As will be appreciated, however, geographic locations are typically not logically divided into areas that may be easily captured by circular AOIs. In this regard, although a user may specify an area of fifteen miles within Dallas, Tex., the metro-Dallas area may include portions outside of a fifteen mile radius of the center of Dallas. Likewise, portions of the area of fifteen miles within Dallas, Tex. may not be within the metro-Dallas area. Thus, by specifying a radial search of fifteen miles within Dallas, Tex., a user may not receive information related to hotels that are actually within the metro-Dallas area, and/or may receive information related to hotels that are not within the metro-Dallas area.

SUMMARY OF THE INVENTION

In light of the foregoing background, embodiments of the present invention provide an improved system, method and computer program product for searching and retrieving points of interest (POIs) within a polygon-shaped area of interest (AOI), where the points of interest may be ranked with respect to one another. In accordance with exemplary embodiments of the present invention, a polygon-shaped AOI can be defined to capture a geographic area not otherwise easily captured by a circular AOI. For example, in accordance with exemplary embodiments of the present invention, AOIs can be defined for non-circular geographic areas of different granularities, such as the United States, a state within the United States, a metropolitan service area (MSA), an area, a neighborhood, a valley or the like. Thus, exemplary embodiments of the present invention permit searching and retrieving POIs within such non-circular geographic areas of interest to users.

According to one aspect of the present invention, a computer-implemented method is provided for searching and retrieving ranked POIs within a polygonal AOI. The method includes defining one or more AOIs, where the AOI has a polygon shape and is defined by a plurality of points. In this regard, a map of a geographic area can be presented, with a plurality of points being selected thereon to thereby define an AOI. After each of some of the points are selected, at least a portion of the AOI can be presented as a shaded overlay of the map such that the shaded overlay is capable of changing as the AOI is being defined. Irrespective of how the AOI is defined, one or more POIs can thereafter be identified within the defined AOI. The identified POIs can then be organized in an order of rankings associated with the identified POIs, where in various instances one or more selected POIs can be organized in an order higher than their respective rankings. In this regard, the POIs can be organized such that information related to at least some of the identified POIs is capable of being requested and thereafter presented in the order of the rankings associated with the respective POIs.

More particularly, one or more POIs can be identified by first selecting one or more characteristics thereof, and when two or more AOIs are defined, also selecting an AOI within which to search for POIs. Then, a search can be conducted for POIs having the selected characteristics and a location within the defined or otherwise selected AOI. In such instances, a location within the defined AOI being determinable based upon the a plurality of points defining the AOI. Thus, for example, the search can be conducted by sending the selected characteristics and the plurality of points defining the AOI across at least one network to an information provider. The information provider can then be capable of searching two or more POI records for two or more POIs, and returning the identified POIs across the network.

The method can further include generating a search record for the identified POIs, and providing the search record to an information provider. The service provider can thereafter be capable of receiving, from a client, a request for information related to at least some of the identified POIs, searching the search record for the requested information, and sending the requested information to the client. In such instances, identifying the POIs can include identifying POIs at two or more subsequent instances. For at least one subsequent instance, then, generating a search record can include updating the search record for one or more additional POIs identified during the respective subsequent instance. Additionally or alternatively, generating a search record can include updating the search record to include one or more additional AOIs within which an identified POI is located during the respective subsequent instance.

According to other aspects of the present invention, a system and a computer program product are provided for searching and retrieving ranked POIs within a polygonal AOI.

BRIEF DESCRIPTION OF THE DRAWINGS

Figure 1:
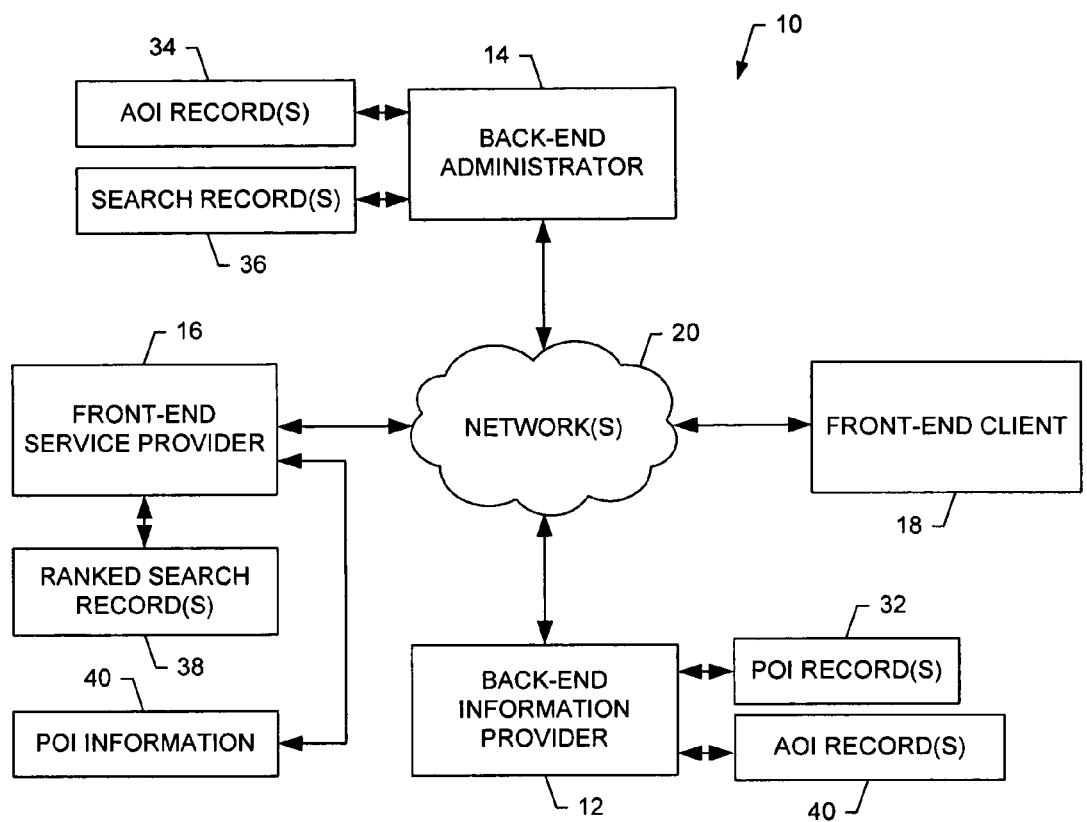
Figure 2:
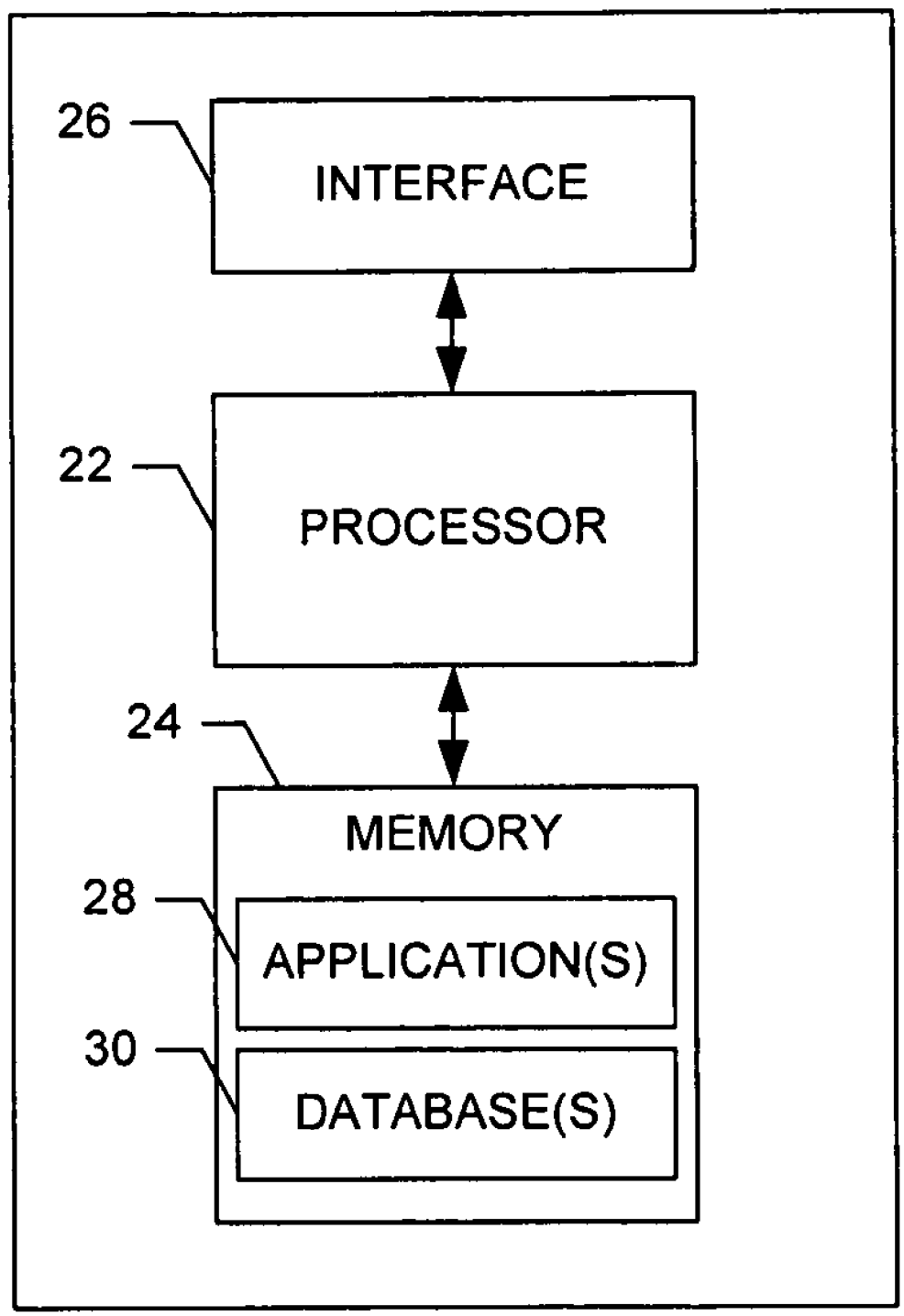
Figure 3:
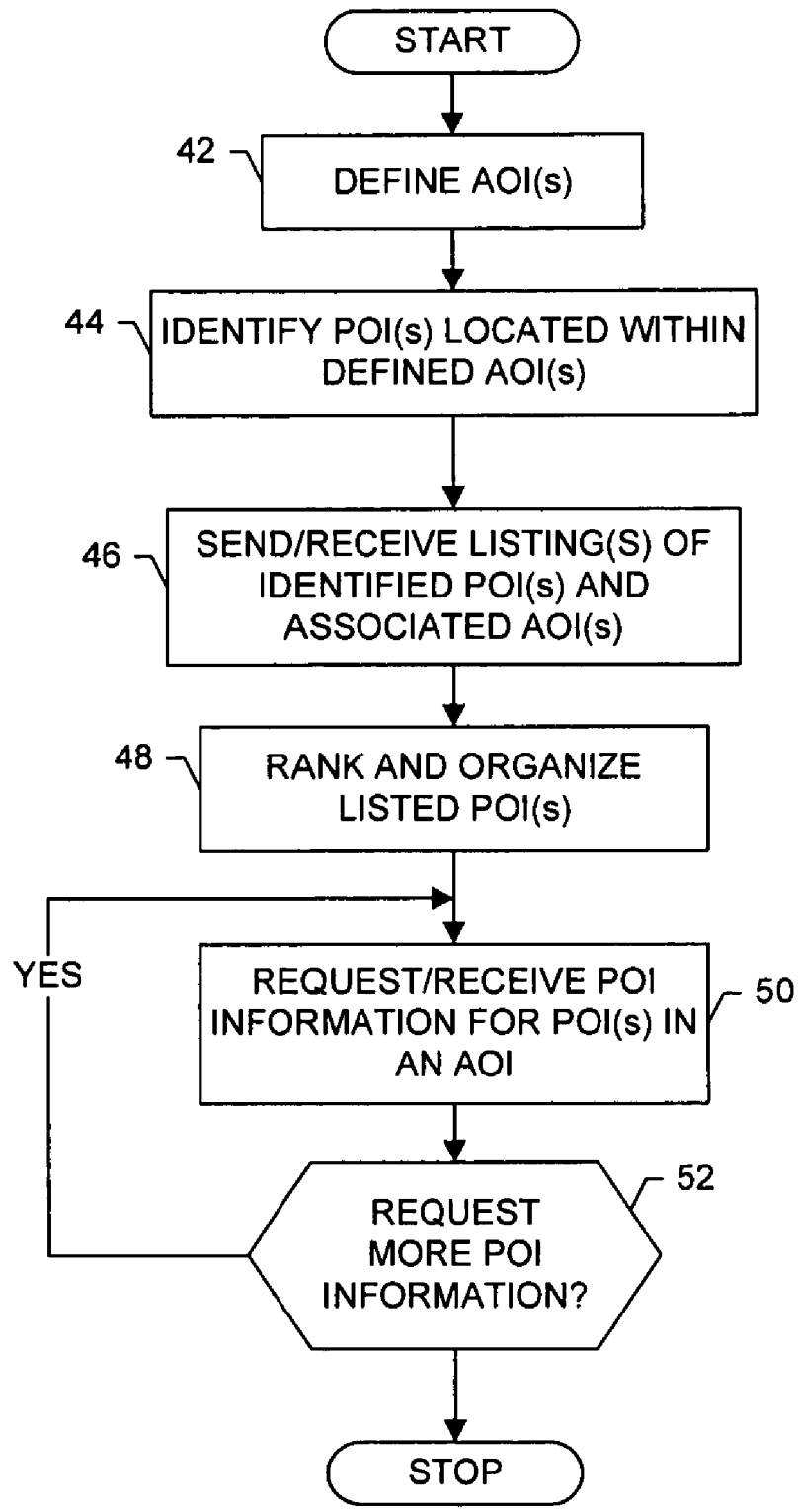
Figure 6:
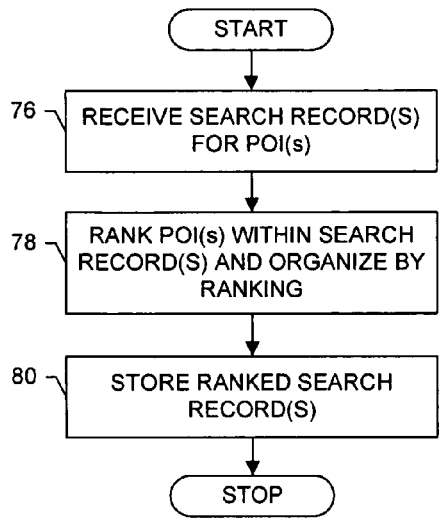
Figure 7:
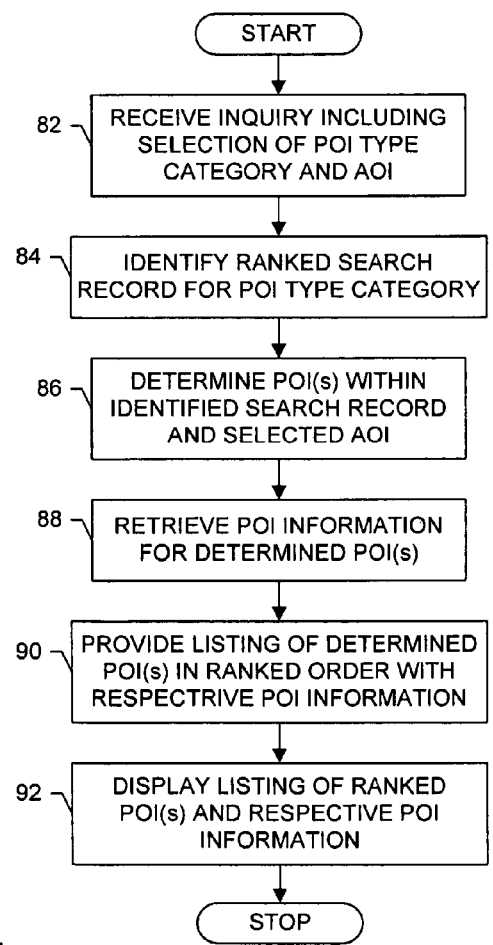
Figure 23:
Figure 24A:
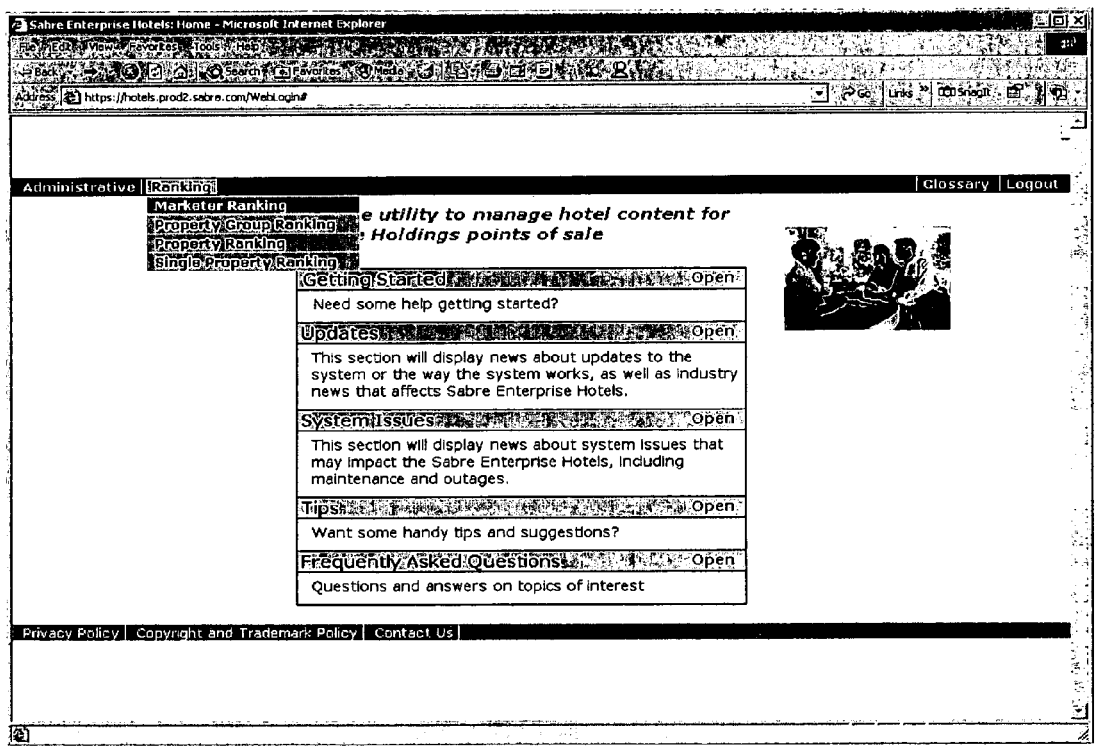
Figure 24B:
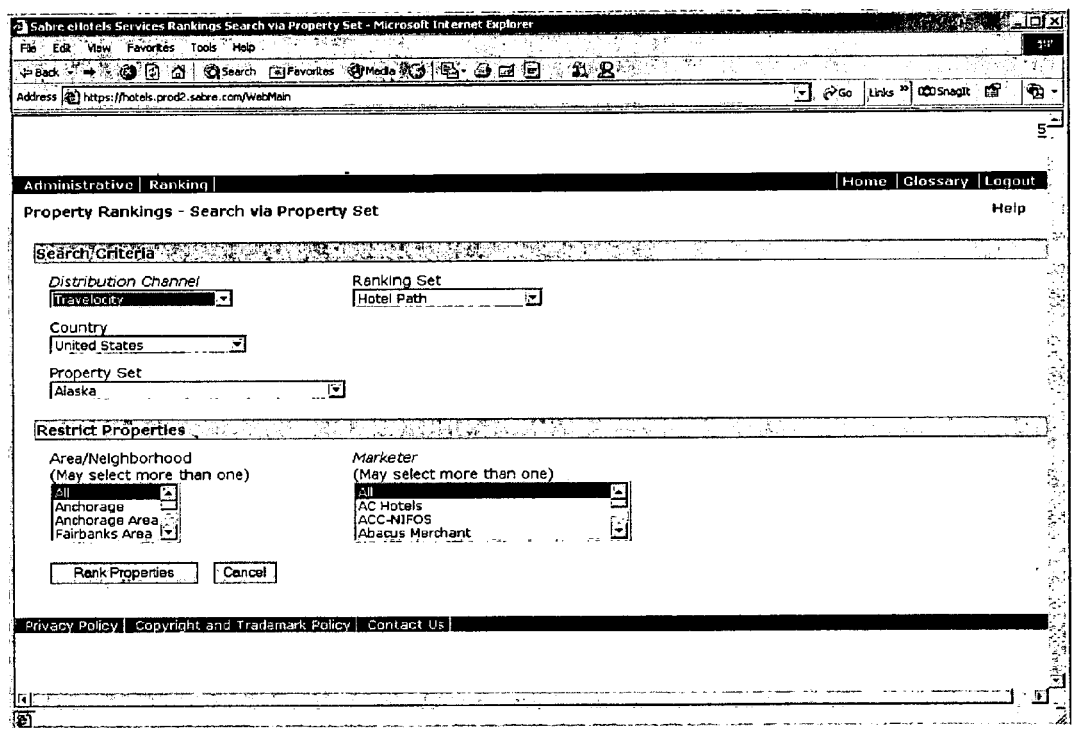
Figure 24C:
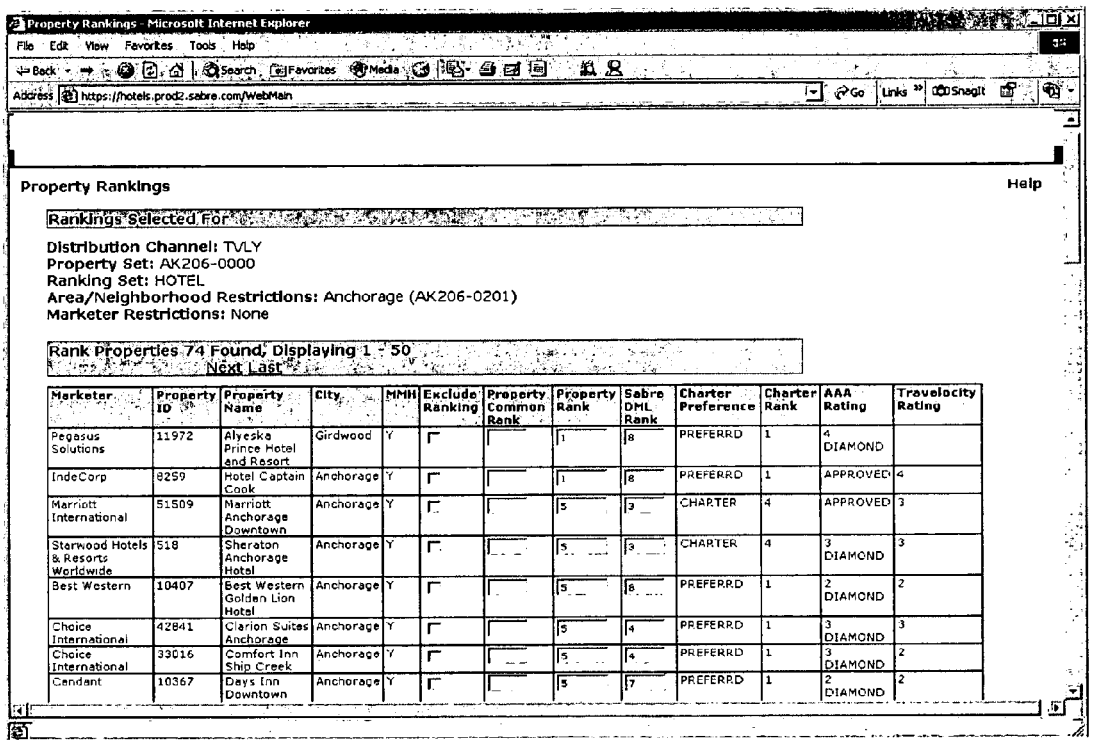

Having thus described the invention in general terms, reference will now be made to the accompanying drawings, which are not necessarily drawn to scale, and wherein:

FIG. 1 is a block diagram of a system for searching for geographic points of interest (POIs) within a geographical area of interest (AOI), in accordance with an embodiment of the present invention;

FIG. 2 is a block diagram of an entity capable of operating as an information provider, administrator, service provider and/or client, in accordance with an embodiment of the present invention;

FIG. 3 is a flowchart illustrating various steps in a method of searching and retrieving ranked POIs within an AOI, in accordance with one embodiment of the present invention;

FIG. 4 is a flowchart illustrating various steps in a method of defining one or more AOIs, in accordance with one embodiment of the present invention;

FIG. 5 is a flowchart illustrating various steps in a method of identifying one or more desired POIs located within one or more of the defined AOIs;

FIG. 6 is a flowchart illustrating various steps in a method of receiving, ranking and organizing listed POIs, in accordance with one embodiment of the present invention;

FIG. 7 is a flowchart illustrating various steps in a method of searching for POI information related to one or more of the ranked and ordered POIs, in accordance with one embodiment of the present invention;

FIGS. 8-23 are exemplary displays that may be presented by one or more of an information provider, administrator, service provider and/or client during operation of an embodiment of the present invention; and FIGS. 24A-24C are exemplary displays illustrating ranking of POIs in accordance to one embodiment of the present invention.

DETAILED DESCRIPTION OF THE INVENTION

The present invention now will be described more fully hereinafter with reference to the accompanying drawings, in which preferred exemplary embodiments of the invention are shown. This invention may, however, be embodied in many different forms and should not be construed as limited to the exemplary embodiments set forth herein; rather, these exemplary embodiments are provided so that this disclosure will be thorough and complete, and will fully convey the scope of the invention to those skilled in the art. Like numbers refer to like elements throughout.

Referring to FIG. 1, a system 10 for searching for geographic points of interest (POIs) within a geographical area of interest (AOI), includes one or more back-end information providers 12, back-end administrators 14, front-end service providers 16 and clients 18 (one of each being shown). Each information provider is capable of directly and/or indirectly communicating with one or more administrators. Each administrator, in turn, is capable of directly and/or indirectly communicating with one or more service providers, and each service provider is capable of directly and/or indirectly communicating with one or more clients. Similarly, each client may be capable of directly and/or indirectly communicating with one or more service providers, each service provider may be capable of directly and/or indirectly communicating with one or more administrators, and each administrator may be capable of directly and/or indirectly communicating with one or more information providers. For example, one or more administrators can be capable of retrieving, from one or more information providers, listings of one or more POIs within one or more AOIs in response to request(s) from the respective administrator(s). The administrator(s) can then provide those listings to one or more service providers in response to request(s) from the respective service provider(s). One or more of the listings can then be further provided to one or more clients in response to request(s) from the respective client(s).

The requests and listings can be transferred from one entity (i.e., information provider 12, administrator 14, service provider 16 or client 18) to another in any of a number of different manners. For example, the requests and listings can be transferred between entities across one or more networks 20. The network(s) can comprise any of a number of different combinations of one or more different types of networks. For example, the network(s) can include one or more data networks, such as a local area network (LAN), a metropolitan area network (MAN), and/or a wide area network (WAN) (e.g., Internet), and include one or more wireline and/or wireless voice networks, including a wireline network such as a public-switched telephone network (PSTN), and/or wireless networks such as IS-136 (TDMA), GSM, GPRS, and/or IS-95 (CDMA). For purposes of illustration, however, as described below, the network comprises the Internet (i.e., WAN) unless otherwise noted.

The information provider 12, administrator 14, service provider 16 and client 18 can comprise any one or more of a number of different entities, devices or the like capable of operating in accordance with exemplary embodiments of the present invention. In this regard, one or more of the information provider, administrator, service provider and client can comprise, include or be embodied in one or more computer systems, such as one or more of a laptop computer, desktop computer, server computer or the like. Additionally or alternatively, one or more of the information provider, administrator, service provider and client can comprise, include or be embodied in one or more portable electronic devices, such as one or more of a mobile telephone, portable digital assistant (PDA), pager or the like. For example, the information provider, administrator, service provider and client can each comprise a processing element capable of communicating with one another across the Internet (e.g., network 20). It should be understood, however, that one or more of the information provider, administrator, service provider and client can comprise or otherwise be associated with a user carrying out one or more of the functions of the respective entity. Thus, as explained below, the term "information provider" can refer to an information provider and/or information provider user, and vice versa. Similarly, the term "administrator" can refer to a administrator and/or administrator user, and vice versa; the term "service provider" can refer to a service provider and/or service provider user, and vice versa; and the term "client" can refer to a client and/or client user, or vice versa.

Referring now to FIG. 2, a block diagram of an entity capable of operating as an information provider 12, administrator 14, service provider 16 and/or client 18 is shown in accordance with one exemplary embodiment of the present invention. Although shown as separate entities, in some exemplary embodiments, one or more entities may support one or more of an information provider, administrator, service provider and/or client, logically separated but co-located within the entit(ies). For example, a single entity may support a logically separate, but co-located, information provider, administrator and/or service provider. It should also be appreciated that one or more entities may be capable of performing one or more functions of one or more other entities. In this regard, an information provider may be capable of performing one or more functions of an administrator, service provider and/or user. Also, an administrator may be capable of performing one or more functions of an information provider, service provider and/or user. Additionally, or alternatively, a client may be capable of performing one or more functions of an information provider, administrator and/or service provider.

As shown, the entity capable of operating as an information provider 12, administrator 14, service provider 16 and/or client 18 can generally include a processor 22 connected to a memory 24. The processor can also be connected to at least one interface 26 or other means for transmitting and/or receiving data, content or the like. In this regard, the interface(s) can include a user interface that can include a display and a user input interface. The user input interface, in turn, can comprise any of a number of devices allowing the entity to receive data from a user, such as an electronic scanner, keyboard, mouse and/or any of a number of other devices components or the like capable of receiving data, content or the like.

The memory 24 can comprise volatile and/or non-volatile memory, and typically stores content, data or the like. In this regard, the memory typically stores software applications 28, instructions or the like for the processor 22 to perform steps associated with operation of the entity in accordance with exemplary embodiments of the present invention. For example, as explained below, when the entity comprises an administrator 14, the memory can store software applications associated with the administrator, such as JavaApplet™ with AWT operating within a connectivity application such as a conventional Web browser. As explained below, the scripts and connectivity application can then be adapted to define, or facilitate an administrator user defining an AOI within which to search for POIs, and communicate with one or more information providers to search for one or more POI within the defined AOI.

In addition to applications 28, the memory 24 can also store one or more databases 30 of information. More particularly, when the entity comprises an information provider 12, the memory can store a database of POI records 32 (see FIG. 1), each POI record identifying a POI and including one or more pieces of information relating to the POI. A POI record can identify the POI in any of a number of different manners, such as by name. A POI record can also include one or more piece of information relating to the POI including location information, such as a geo-code (e.g., latitudinal and longitudinal coordinates) or address (street address, proximate street intersection, city, state, zip or postal code, county/region, and/or country). A POI record can also include one or more other piece of information relating to the POI, such as information such as a telephone number or other contact information associated with the POI, and/or goods and/or services offered at the POI. In addition, a POI record can include type categories associated with the POI including, for example, an auto club, airport, amusement park, auto parking, auto service center, automatic teller machine (ATM), bank, car rental center, chamber of commerce, restaurant, city hall, community center, convenience store, convention center, corporation, courthouse, secondary school, gas station, golf course, multiple listing service (MLS) listing or other listing of property for sale, rent or exchange, historic site, hospital, hotel, library, park, rail station, shopping center, museum, bus station, police station, ski resort, university, fitness center, movie theater, cruise excursion, or the like.

Further, one or more POIs may be also be associated with type sub-categories within respective type categories, where the sub-categories may refer to one or more attributes of the respective type categories. For example, one or more POIs for businesses may be further associated with type sub-categories identifying a particular commercial business or chain of businesses associated with the respective businesses (e.g., Marriott hotels, Hertz can rental centers, etc.). Additionally or alternatively, for example, one or more POIs associated with a "hotel" type category may be further associated with type sub-categories identifying one or amenities associated with the respective hotels, such as high-speed Internet connection, high definition television (HDTV), resort, swimming pool, spa facility, or the like. Further, one or more POIs associated with a "car rental center" type category may be further associated with type sub-categories identifying one or more attributes associated with the respective car rental centers, such as offering luxury automobiles, sport utility vehicles (SUVs) or the like. As explained below, then, when POIs are explained as being associated with type categories, it should be understood that one or more of those POIs may be further associated with type sub-categories without departing from the spirit and scope of the present invention. Thus, in such instances, any function described as being at least partially based upon a type category of a POI may, in various instances, be further based upon a type sub-category of the respective POI.

When the entity comprises an administrator 14, for example, the memory 24 can store a database 30 of AOI records 34 (see FIG. 1), each AOI record identifying an AOI and including one or more pieces of information relating to the AOI. An AOI record can identify the AOI in any of a number of different manners, such as by an identifier (ID), name or the like. In addition to, or in lieu of, an ID, name or the like, an AOI record can identify the AOI by a geographic city, county/region, state and/or country within which the AOI is included.

In some embodiments, an AOI record 34 can identify the AOI by one or more granular categories associated with the AOI. In this embodiment, the geographic area that the AOI defines, or within which the AOI is located, can include a number of hierarchical categories with varying degrees of granularity. In the geographic area, each granular category above the first category generally comprises two or more partitions, with the partitions of the category being groups of the sub-partitions of the category below. For example, a geographic area of the United States, or a state within the United States, can include four granular categories. In this regard, at the largest category the geographic area can include one or more metropolitan service areas (MSAs), each of which can include one or more areas. In turn, one or more areas can include one or more neighborhoods, and one or more neighborhoods can include one or more valleys.

As evident, the number of granular categories in the geographic area may depend on a number of different parameters including, for example, the geographic area, the POIs searched for within the geographic area (described below), and/or the service provider 16 requesting POIs within the geographic area. Therefore, it should be understood that a geographic area defined by or including an AOI can include any number of granular categories, one or more of which may overlap. Also, although an AOI may define a geographic area representing a granular category, one or more geographic areas defined by respective AOIs may be further included within one or more larger-level granular categories. For example, an AOI defining a geographic neighborhood (e.g., Highland Park) may be included within an area (e.g., Dallas, Tex.), which may be defined by another AOI. The area, then, may be further included within a MSA (e.g., Dallas/Ft. Worth, Tex.) that may or may not define yet another AOI.

Each AOI record 34 can also include one or more pieces of information relating to the AOI. Typically, for example, each AOI record includes a definition of the AOI, such as a definition of the AOI within a given geographic area. An AOI can be defined in any of a number of different manners. For example, one or more AOIs can be defined by an absolute area, such as based upon a plurality of geographic points. In such instances, the geographic points can be defined in any of a number of different manners, such as by geo-codes or addresses. Additionally or alternatively, one or more AOIs can be defined by a relative area, such as based upon a geographic point, line or other shape (i.e., reference), and an area about the reference. For example, one or more AOIs can be defined by a reference geo-code, address or the like, and a radial area about the reference geo-code. Thus, as will be appreciated, an AOI can be defined to comprise any of a number of different shapes, including a circle, rectangle, polygon or the like.

In addition to the AOI records 34, the databases 30 of an administrator 14 can also store search records 36 (see FIG. 1), each search record identifying one or more POIs and the one or more AOIs within which the respective POIs are located. The search records can be configured in the databases in any of a number of different manners. For example, the search records can be configured such that each search record is associated with a POI type category, and identifies one or more POIs of the respective type, and one or more AOIs within which the identified POIs are located. Alternatively, for example, the databases can configure the search records such that each search record is associated with an AOI, and identifies one or more POIs located therein. For purposes of description only, the search records will be hereinafter explained as being associated with a POI type category, identifying the POIs of the respective type and AOIs within which the identified POIs are located, although the following description can apply equally to search records configured in any of a number of other manners.

As explained below, the service provider 16 is capable of downloading, importing or otherwise receiving one or more search records 36 from one or more administrators 14. Thus, like the administrator, memory 24 of service provider can likewise store a database 30 of search records. Within the database of the service provider, the POIs within the type-category search records can be organized in any of a number of different manners. In this regard, the POIs of one or more type categories may have rankings within the respective type categories. In one typical exemplary embodiment, then, the POIs within those search records are organized in order of the rankings of the POIs within the respective type categories to produce ranked search records 38. For example, POIs comprising hotels may have rankings within the hotel type category. Thus, the search record for the hotel POIs can be organized in the database in order of those rankings. Similarly, search record for car rental center POIs can be organized in the database in order of rankings of car rental centers, and so forth.

In addition to the ranked search records 38, the database 30 of the service provider 16 can store or otherwise have accessible one or more additional pieces of information related to the POIs identified in the ranked search records (i.e., POI information 40). In addition to or in lieu of directly storing information relating to a POI, in various instances the service provider may store (or have accessible) links to other locations (e.g., uniform resource locators—URLs) from which such POI information can be accessed and retrieved. The information can comprise any of a number of different pieces of information related to a POI. For example, POI information can include a description of the POI and/or goods/services offered by the POI, address or other locator of the POI, photographs or other multimedia relating to the POI, and/or information relating to purchasing and/or reserving goods/services offered by the POI. More particularly with respect to a hotel POI, for example, in addition to the ranked service record that identifies one or more AOIs within which the hotel is located, the service provider may store a description of the hotel and a link to an on-line form from which one or more rooms at the hotel can be booked or otherwise reserved.

As will be appreciated, in various instances one or more pieces of POI information 40 may be dynamic, capable of varying from instance to instance, and/or from context to context. For example, POI information relating to goods/services offered by a POI may include an indication of the availability of such goods/services. More particularly, for example, POI information for a hotel may include an indication of the price and/or availability of one or more rooms of the hotel, POI information for a car rental center may include an indication of the price and/or availability of an automobile for rent, and so forth. In such instances, the price and/or availability of goods/services offered by the POI may not only vary from instance to instance, but may also vary from context to context, such as the dates for which the desired goods/services may be requested. Thus, the POI information for one or more POIs may be dynamically generated or otherwise provided based upon one or more parameters upon which the POI information may be based, such as the date/time the POI information is accessed or otherwise retrieved, the date/time goods/services offered by the POI are requested, the quantity of goods/services requested from the POI, and/or the quantity or number of persons desiring to receive the goods/services offered by the POI.

Generally, in accordance with exemplary embodiments of the present invention, the administrator 14 is capable of defining one or more AOIs, and thereafter creating and storing AOI records 34 for the defined AOIs. The administrator can then identify one or more POIs located within one or more defined AOIs, storing the identified POIs and associated AOIs in one or more search records 36. The administrator can send, and one or more service providers 16 can receive, listings of the identified POIs and AOIs within which the listed POIs are located, such as by sending the search records to the service provider. After receiving the listings of the identified POIs and AOIs within which the listed POIs are located, the service provider can rank the identified POIs, and can permit one or more clients 18 to search for information related to one or more of the ranked POIs. In this regard, the service provider can receive an inquiry or request to receive information for one or more POIs located within an AOI. The service provider can then search the listings of POIs and associated AOIs to identify the requested POIs, and present the user with POI information related to the requested POIs in the ranked order of the POIs.

Reference is now made to FIG. 3, which illustrates various steps in a method of searching and retrieving ranked POIs within an AOI, in accordance with one exemplary embodiment of the present invention. As shown in block 42, the method includes an administrator 14 defining one or more AOIs. The administrator can define the AOIs in any of a number of different manners. In one exemplary embodiment illustrated in FIG. 4, for example, the administrator defines the AOIs by executing or otherwise launching an administrator application (i.e., application 28) for defining AOIs. Under control of the administrator, then, the application is directed to display or otherwise present a map of a geographic area including a desired AOI, as shown in block 56. As will be appreciated, in various instances the administrator may manipulate the map, or more particularly direct the application to manipulate the map, to more clearly present a desired AOI. For example, the administrator can direct the application to pan across the map, zoom/un-zoom the map to a particular portion of the map, center/re-center the map about the desired AOI or the like.

After the map of the geographic area including the desired AOI is displayed, the administrator 14 selects, and the application 28 receives a selection of, a type of AOI to define, as shown in block 58. In this regard, as explained above, an AOI can be defined to comprise any of a number of different shapes. In more typical exemplary embodiments, however, the desired AOI is defined to comprise a circle or a polygon. Irrespective of the type of AOI, before or after selecting the type of AOI, the administrator selects, on the displayed geographic map, one or more points on the map such that the desired AOI is thereby defined based upon the selected points, as shown in block 60. And as the administrator selects the points to define the AOI, the application can display the AOI, such as by a shaded overlay of the geographic map already displayed by the application, the shaded overlay changing with each selected point to illustrate the AOI as the AOI is being defined.

The points can be selected in any of a number of different manners. For example, one or more points can be selected by entering or otherwise receiving the selected points into a field (e.g., drop-down menu, text field, etc.) displayed by the application 28. Additionally or alternatively, for example, one or more points can be selected directly on the geographic map, such as by positioning a movable pointer over the points on the map and actuating a user input interface (e.g., operating a mouse to position a pointer over the points and clicking a button of the mouse).

More particularly, for example, when the desired AOI comprises a circle, the administrator 14 can select a center reference point. The selected center point, then, can be combined with a radial distance specified by the administrator, application 28 or otherwise predefined, to thereby define a circular AOI about the reference point. In this embodiment, only one point is needed to define the circle. Alternatively, when the desired AOI comprises a polygon, the administrator 14 can select a plurality of points that, when connected, form a bounded polygon. In this regard, the administrator can select a first point and thereafter select subsequent points to define sides of the polygon, the sides being defined by the each selected point and an immediately preceding selected point. In one embodiment, after the administrator has selected three points, the system automatically closes the polygon defined by the points. In other embodiments, the administrator can again select the first point to thereby define a closing side of the polygon from the last selected point to the first point.

As will be appreciated, and as suggested above, the points selected by the administrator 14 can be specified in any of a number of different manners. For example, the points can be specified as geo-codes (latitudinal/longitudinal coordinates) or addresses. In various instances, however, it may be desirable for the application 28 to operate with all of the selected points being specified in the same manner, and if further desired, specified in a particular manner. In this regard, although the application may receive selections of points specified in any of a number of different manners, the application may be configured to convert one or more point specifications or otherwise obtain a conversion of one or more point specifications, such as by communicating with another entity (e.g., an information provider 12). More particularly, the application may be configured to convert points, or obtain conversions of those points, such that all of the points are specified in the same manner, and if so desired, specified in a particular manner. For example, presume that the administrator has specified four points of a polygon AOI, the first two points being specified as geo-codes, the third point specified as an address, and the last point specified as a geo-code offset from the third point. In such an instance, for example, the address (i.e., third point) and geo-code offset from that address (i.e., fourth point) can be converted to geo-codes (i.e., the same manner in which the first two points are specified).

After defining the AOI, the administrator 14, or more particularly the application 28, can generate an AOI record for the defined AOI and store the AOI record in a database 30 in memory 24 of the administrator, as shown in block 62. As indicated above, the AOI record can include the points defining the AOI, as well as any reference points needed to define the AOI (e.g., center point of a circular AOI). In addition, the AOI record can include a number of other pieces of information relating to the AOI, one or more of which may be specified by the administrator, the application or otherwise predetermined. For example, the AOI record can include information identifying the AOI within the database, such as an ID, name and/or a geographic city, county/region, state and/or country within which the AOI is included. Further, for example, the AOI record can include one or more granular categories associated with the AOI (e.g., MSA, area, neighborhood, valley, etc.).

After storing the AOI record in the database 30 in memory 24 of the administrator 14, one or more other AOIs can be defined, as shown in block 64. For each defined AOI, then, the method for defining the AOI can repeat, beginning with presenting a map of a geographic area including a desired AOI (see block 56). Also for each defined AOI, an AOI record can be generated and stored in the database. Thus, the administrator can store and maintain a database including a number of different AOI records.

Again referring to FIG. 3, after defining one or more AOIs, the administrator 14 identifies one or more desired POIs located within one or more of the defined AOIs, as shown in block 44. Like defining the AOIs, the desired POIs located within the defined AOIs can be identified in any of a number of different manners. Generally, in accordance with one exemplary embodiment of the present invention, desired POIs located within defined AOIs can be identified by searching the POI records in the database 30 stored in memory 24 of one or more information providers 12. As indicated above, each POI record for a POI stores a location of the POI. And as such, the POIs located within defined AOIs can be identified based upon the locations of the POIs in the POI records, and based upon the definitions of the AOIs within which one or more of the POIs are located.

More particularly, as illustrated in FIG. 5 for example, the administrator 14 identifies desired POIs by again executing or otherwise launching an administrator application (i.e., application 28) for searching for POIs within AOIs. The application for searching for POIs can comprise a separate application than that for defining the AOIs, but in one exemplary embodiment, the application for searching for POIs is the same as that for defining the AOIs. Thus, in instances in which the application has already been executed or launched to define one or more AOIs, the administrator can continue to operate the application without re-executing or re-launching the application.

To identify desired POIs within one or more AOIs, then, the administrator 14 selects or otherwise identifies one or more characteristics of the desired POIs and, and selects or otherwise identifies an AOI within which to search for the desired POIs, as shown in block 66. The selected characteristics of the desired POIs can comprise any of a number of different characteristics included in the POI records in the database 30 stored in memory 24 of one or more information providers 12.

For example, the selected characteristic of the desired POIs can comprise the type category of the desired POIs, as such is explained above with respect to the POI records.

The AOI can likewise be selected in any of a number of different manners based upon one or more pieces of information identifying the AOI. For example, the AOI can be selected based upon an ID, name and/or a geographic city, county/region, state and/or country within which the AOI is included. Further, for example, the AOI can be selected based upon one or more granular categories associated with the AOI (e.g., MSA, area, neighborhood, valley, etc.). As explained above, such identifying information may be part of an AOI record 34, and thereby associated with the AOI, within the database 30 of the administrator 14. Alternatively, in various instances in which the application has already been operated to define an AOI, the AOI can be selected as the just-defined AOI, which as explained above, may be displayed by the application, such as by a shaded overlay of the geographic map already displayed by the application.

Irrespective of exactly how the POI characteristics and AOI within which to search for desired POIs having those characteristics are selected, the administrator 14 can search for, or more particularly direct the application 28 to search for, the desired POIs based upon the selected characteristics and AOI, as shown in block 68. More particularly, the application can be directed to search for the desired POIs based upon the selected characteristics and the definition of the AOI, including the points defining the AOI and any reference points needed to define the AOI (e.g., center point of a circular AOI). The defining and reference points, like the AOI identifying information, may be part of an AOI record 34, and thereby associated with the AOI, within the database 30 of the administrator.

The administrator application 28 can be directed to search for the desired POIs in any of a number of different manners. In one exemplary embodiment, for example, the application can send the selected POI characteristics and definition of the selected AOI to one or more information providers 12. In response to receiving the characteristics and AOI definition, the information providers can search their POI records 32 in databases stored in memory 24 of the information providers. In this regard, the information providers can search their POI records to identify POIs having the selected characteristics and a location within the bounds of the selected AOI, as such may be determined based upon the definition of the selected AOI. For example, when the POIs have locations specified as geo-codes and the AOI is defined as a polygon also specified as geo-codes, the information providers can search their POI records to identify POIs that have the selected characteristics and geo-codes within the bounds of the geo-codes defining the selected, polygonal AOI.

In response to the administrator application 28 search for the desired POIs, the application can receive a listing of the desired POIs having the selected characteristics and located within the selected AOI, as shown in block 70. More particularly, for example, after the information providers 12 identify the desired POIs based upon the application search, the information providers can send, and the application can receive, a listing of the desired POIs having the selected characteristics and located within the selected AOI. The listing of the desired POIs includes or otherwise identifies those POIs that have the selected characteristics and are located within the selected AOI. For example, when the selected characteristics and AOI comprise hotels (type category) and Dallas/Ft. Worth, respectively, the listing can identify those hotels located within Dallas/Ft. Worth.

After receiving the listing of the desired POIs, the administrator 14, or more particularly the application 28, can generate search records 36 for the POIs having the selected characteristics, or more particularly for example, the selected POI type category, as shown in block 72. Like the AOI records, the search records can then be stored in a database 30 in memory 24 of the administrator. As indicated above, the search records can be associated with a POI type category and identify the POIs of the respective type category and the AOIs within which the identified POIs are located. Thus, when a search record has not already been generated for the selected POI type category (selected POI characteristic), such a search record can be generated. The search record, then, can be associated with the selected POI type category, and can include the listing of POIs having the respective type category, each listed POI also being associated with the selected AOI within which the listed POI is located.

After storing the search record 36 in the database 30 in memory 24 of the administrator 14, the administrator application 28 can identify one or more of the same or different desired POIs located within the same or different AOIs, as shown in block 74. For each set of desired POIs located within a desired AOI, then, the method for identifying those POIs can repeat, beginning with selecting characteristics of the desired POIs and selecting an AOI within which to search for the desired POIs (see block 66).

Also for each listing of desired POIs received by the administrator application 28, a search record 36 can be generated and stored in the administrator database 30. Thus, like the AOI records 34, the administrator 14 can store and maintain a database including a number of different search records. As will be appreciated, however, one or more POIs within a given type category may be located within one or more AOIs. Thus, in various instances, the administrator application may receive a listing of POIs of a POI type category for which a search record already exists. In such instances, the application may update the existing search record to include any additional POIs in the listing not otherwise included in the search record, the additional POIs also being associated with the selected AOI of the search record. In addition, for any POIs in the listing and already included in the search record, the application may update the existing search record such that those POIs are further associated with the selected AOI of the search record.

Thus, each search record 36 may be associated with a POI type category, and include POIs of the respective type category and one or more AOIs within which those POIs are located. For example, a search record for hotels (POI type category) may list a plurality of hotels where each is associated with an AOI, and where one or more of the hotels may be associated with more than one AOI. More particularly for example, one or more of the hotels may be associated with "Dallas/Ft. Worth" (MSA AOI), and from among those hotels, one or more may be further associated with "Dallas" (area AOI). And one or more of those hotels associated with the AOIs Dallas/Ft. Worth and Dallas may be further associated with "Highland Park" (neighborhood AOI).

Irrespective of how the administrator 14 identifies the desired POIs located within one or more of the defined AOIs, the administrator or administrator application 28 sends, and one or more service providers 16 receive, one or more listings of the desired POIs and their associated AOIs as shown in block 46 of FIG. 3. The service provider, or more particularly the service provider application 28 under direction of the service provider, can then rank the listed POIs and organize the POIs in accordance with their ranking, as shown in block 48. In this regard, a method of receiving, ranking and organizing listed POIs in accordance with one exemplary embodiment of the present invention is illustrated in FIG. 6. Thus, now with reference to FIG. 6, a service provider application can receive, rank and order listed POIs by receiving the search records for those POIs from the administrator, as shown in block 76.

After receiving the search records 36 for the desired, listed POIs, the service provider 16 can rank, or direct the application 28 to rank, the POIs within the search records, as shown in block 78. The POIs can be ranked in any of a number of different manners. For example, the POIs within respective search records (e.g., POI type category search records) can be ranked alphabetically. Alternatively, for example, the POIs within respective search records can be ranked based upon quality rankings (four star, three, star, two star, one star, etc.) associated with the POIs. In another alternative example, the POIs within respective search records can be ranked based upon a price or price category associated with the goods/services offered by the POIs.

In one or more instances of ranking the POIs within respective search records 38, one or more of the POIs may be ranked higher than those POIs would otherwise have been determined. For example, one or more POIs ranked alphabetically or based upon quality rankings may have a higher ranking than their alphabetical placement or quality ranking. In this regard, one or more such POIs may be ranked higher based upon an additional promotional consideration provided to a service provider 16 by or on behalf of the respective POIs. Also, for example, one or more such POIs may be ranked higher based upon promotions offered by the respective POIs. Additionally or alternatively, one or more POIs may be ranked higher based upon a popularity of the respective POIs within the respective type category and/or respective AOI, where the popularity can be determined in any of a number of different manners (e.g., surveys, etc.).

As will also be appreciated, in various instances one or more POIs may not be ranked or otherwise have a ranking consistent with the other POIs within the same search record. In such instances, those POIs without a ranking (or a consistent ranking) may be assigned a default ranking consistent with the other POIs such that all of the POIs in the respective type category can be organized in accordance with their ranking. The default ranking can be set in a number of different manners, such as based upon the highest or lowest ranking of POIs in the same category, or the mean or median ranking of POIs in the same category.

FIGS. 24A-24C illustrate an interface provided by the system that allows a service provider to rank the individual POIs. As illustrated in FIG. 24A, the interface allows you to perform ranking at various levels. There are currently four types of ranking functionality: 1) Marketer Ranking: allows ranking of a particular marketer or brand, 2) Property Group Ranking: allows ranking at the marketing chain level, 3) Property Ranking: allows ranking at the AOI (property set) level, and 4) Single Property Ranking: allows ranking of individual properties. To rank at the AOI level, the user selects the property ranking tool. With regard to FIG. 24B, the user then chooses a Distribution Channel, Ranking Set, Country, and Property Set and/or sub AOI (Area/Neighborhood). As illustrated in FIG. 24C, the user is then provided with all properties within the AOI. The interface includes various rankings and information about the properties from various sources. The user can then use the interface to rank the properties. The user may exclude certain properties from the rankings, use suggested rankings, move properties up or down in the rankings, etc.

After the POIs within the respective search records 36 are ranked, the service provider 16, or more particularly the service provider application under the direction of the service provider, can organize the POIs within the respective search records in accordance with the rankings, as also shown in block 78. For example, the POIs can be organized in sequential order based upon their rankings, beginning with a highest ranked POI. Alternatively, for example, the POIs may be organized in sequential order beginning with the lowest ranked POI, such as in instances where the lowest ranked POI may be more desirable (e.g., for price rankings, etc.). Irrespective of how the POIs are organized in accordance with their rankings, ranked search records 38 including the ranked POIs can thereafter be stored in a database 30 in memory 24 of the service provider, as shown in block 80.

Again referring to FIG. 3, after ranking and ordering the listed POI(s), the service provider 16 permits one or more clients 18 to search for POI information related to one or more of the ranked and ordered POIs. As shown in block 52, then, a client sends, and the service provider receives, an inquiry or request to receive information for one or more POIs located within an AOI, and in response, provides POI information 40 related to the requested POIs. More particularly with reference to FIG. 7, in accordance with one exemplary embodiment, the service provider can receive an inquiry from a client, the inquiry including a selection of a POI type category (e.g., hotels, car rental centers, etc.) and AOI (e.g., Dallas/Ft. Worth, Dallas, Highland Park, etc.), as shown in block 82. As will be appreciated, the service provider can receive the inquiry in any of a number of different manners. For example, the service provider can make a Web page or other content available to the client across the network(s) 20, the Web page including one or more fields (e.g., drop-down menu, text field, interactive geographical map, etc.) for receiving a selection of a POI type category and AOI. The client can then access the Web page, such as from a conventional Web browser (i.e., application 28) operating on the client, and make a selection of a POI type category and AOI into the fields. The inquiry including the selections can then be sent back across the network(s) to the service provider, which can receive the inquiry.

As explained above, in various instances one or more pieces of POI information 40 may be dynamic, capable of varying from instance to instance, and/or from context to context. For example, the price and/or availability of goods/services (i.e., POI information) offered by the POI may not only vary from instance to instance, but may also vary from context to context, such as the dates for which the desired goods/services may be requested. In this regard, POI information for one or more POIs may be dynamically generated or otherwise provided based upon one or more parameters upon which the POI information may be based (e.g., date/time the POI information is accessed or otherwise retrieved, the date/time goods/services offered by the POI are requested, the quantity of goods/services requested from the POI, and/or the quantity or number of persons desiring to receive the goods/services offered by the POI). Thus, in addition to selecting a POI type category and AOI, the inquiry may further include one or more additional parameters upon which POI information may be based, the additional parameters being specified by the client, client application or otherwise predefined.

Once the service provider 16 has received the inquiry including the selection of the POI type category and AOI and any additional parameters, the service provider identifies a ranked search record 38 for the selected POI type category, such as from the search records in the database 30 in memory 24 of the service provider, as shown in block 84. From the identified search record, then, the service provider determines those POIs that are located within the selected AOI, the search record identifying a number of POIs and the AOIs within which those POIs are located, as shown in block 86. The service provider then accesses the database of POI information 40 in memory of the service provider to directly or indirectly (e.g., accessing via links provided in the database of POI information 40) retrieve information relating to those POIs in the identified search record that are located within the selected AOI, as shown in block 88. And when the inquiry includes additional parameters upon which the POI information may be based, the service provider retrieves the POI information at least partially based upon those additional parameters. In response to the inquiry, then, the service provider can provide the client 18 with a listing of the POIs in the identified search record that are located within the selected AOI, the POIs in the listing being provided in the ranked order the respective POIs are included in the respective search record, and provided with the retrieved POI information, as shown in block 90.

Upon receipt of the listing of ranked POIs and associated POI information 40, a portion or all of the listing and associated POI information can be displayed or otherwise presented by the client 18, or more particularly by a client application 28, as shown in block 92. In addition to presenting the listing of ranked POIs, the client application may be adapted to display a geographic map identifying the locations of one or more of the POIs and/or the previously selected AOI within which the POIs are located. Thus, a client user may view a listing of POIs and information relating to the listed POIs, as well as a geographic map identifying the locations of the POIs and/or the selected AOI within which the POIs are located.

As explained above, the POI information 40 can comprise any of a number of different pieces of information related to a POI, such as a description of the POI and/or goods/services offered by the POI, address or other locator of the POI, photographs or other multimedia relating to the POI, and/or information relating to purchasing and/or reserving goods/services offered by the POI. More particularly with respect to a hotel POI, for example, in addition to the ranked service record that identifies one or more AOIs within which the hotel is located, the service provider may store a description of the hotel and a link to an on-line form from which one or more rooms at the hotel can be booked or otherwise reserved. Thus, after the POI information is displayed, the client may be capable of further performing one or more additional functions based upon the displayed POI information, such as purchasing and/or reserving goods/services offered by one or more of the displayed POIs.

Referring again to FIG. 3, after the client 18 receives the POI information related to the requested POIs, the client may request information for one or more other POIs located within the same or another AOI, as shown in block 54. For each inquiry of the client, then, the service provider 16 can receive an inquiry from the client, the inquiry including a selection of a POI type category, an AOI and, if so desired, one or more additional parameters upon which POI information may be based (see block 82). Based upon the inquiry, the service provider can provide the client with another listing of ranked POIs and associated POI information, which the client can thereafter display, such as in the same manner as before.

To further illustrate benefits of exemplary embodiments of the present invention, reference is now made to the exemplary displays shown in FIGS. 8-23. Although a more particular description of an exemplary embodiment of the present invention will be described below, it will be understood that the below-described embodiment is but one example embodiment of the present invention, and should therefore not be taken to limit the scope of the present invention. It will further be understood that the displays shown in FIGS. 8-23 are also merely exemplary displays of those that could be presented by applications 28 operating on one or more computer systems of the information provider 12, administrator 14, service provider 16 and/or client 18 during operation of embodiments of the present invention, and should likewise not be taken to limit the scope of the present invention.

Figure 8:
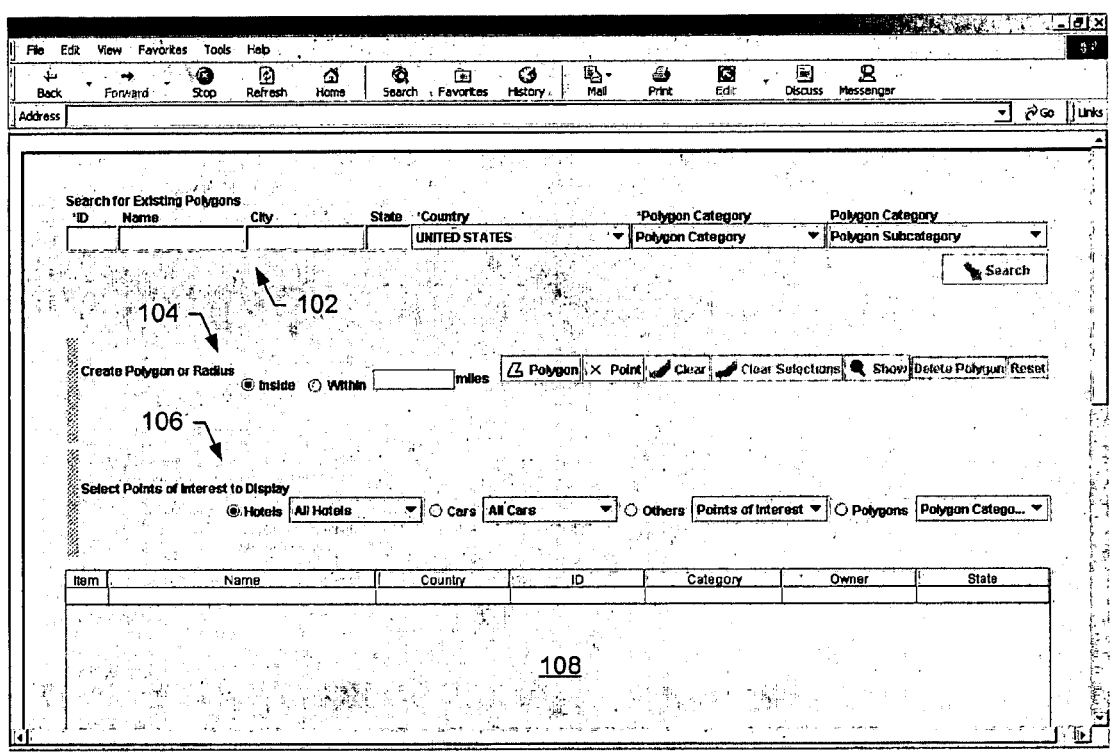
Figure 9:
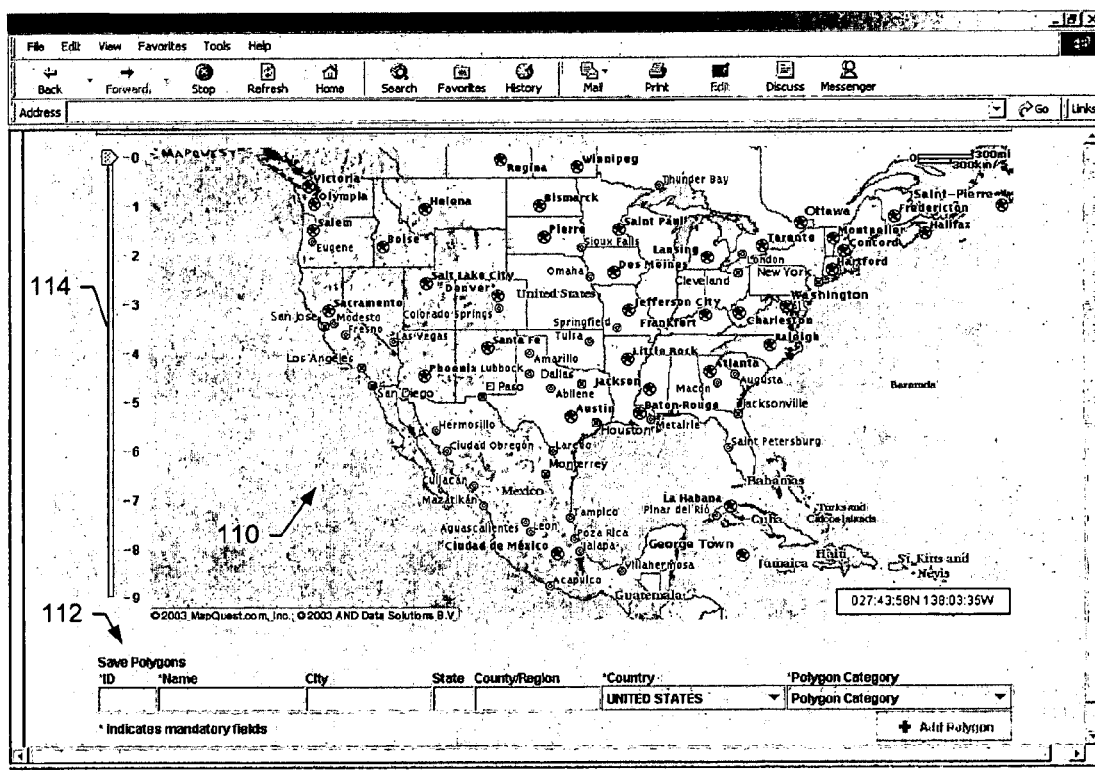

As shown and described below, the administrator 14 can define the AOIs and/or identify desired POIs located within defined AOIs by executing or otherwise launching a JavaApplet™ with AWT (i.e., application 28) from within a conventional Web browser such as Microsoft® Internet Explorer, exemplary displays of the graphical user interface (GUI) 100 of such an application being shown in FIGS. 8 and 9. As shown, the GUI includes a window portion 102 for searching for existing polygons (i.e., POIs), a window portion 104 for creating polygons or radial areas of interest (i.e., defining AOIs), a window portion 106 for selecting points of interest (POIs) to display (i.e., identifying desired POIs located within defined AOIs), a window portion 108 for listing search results (AOIs, POIs, etc.), a window portion 110 for displaying a geographic map, and a window portion 112 for saving polygons.

Figure 10:
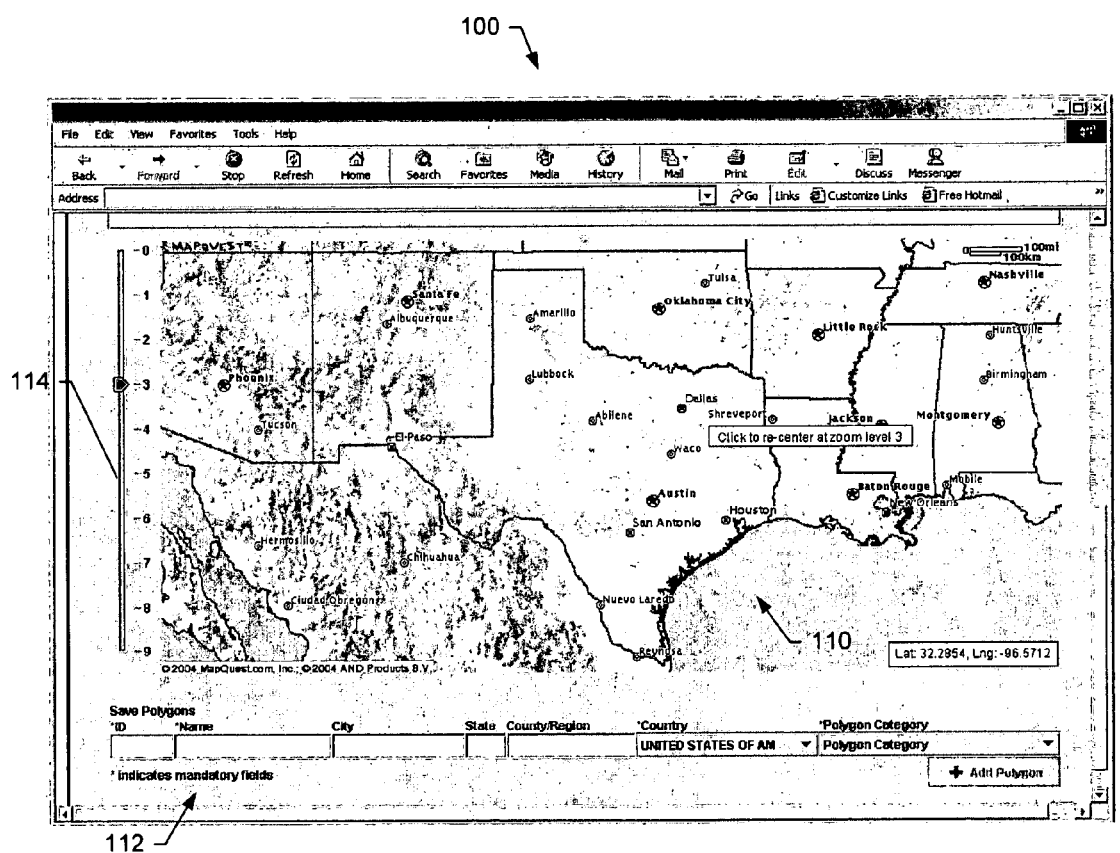
Figure 11:
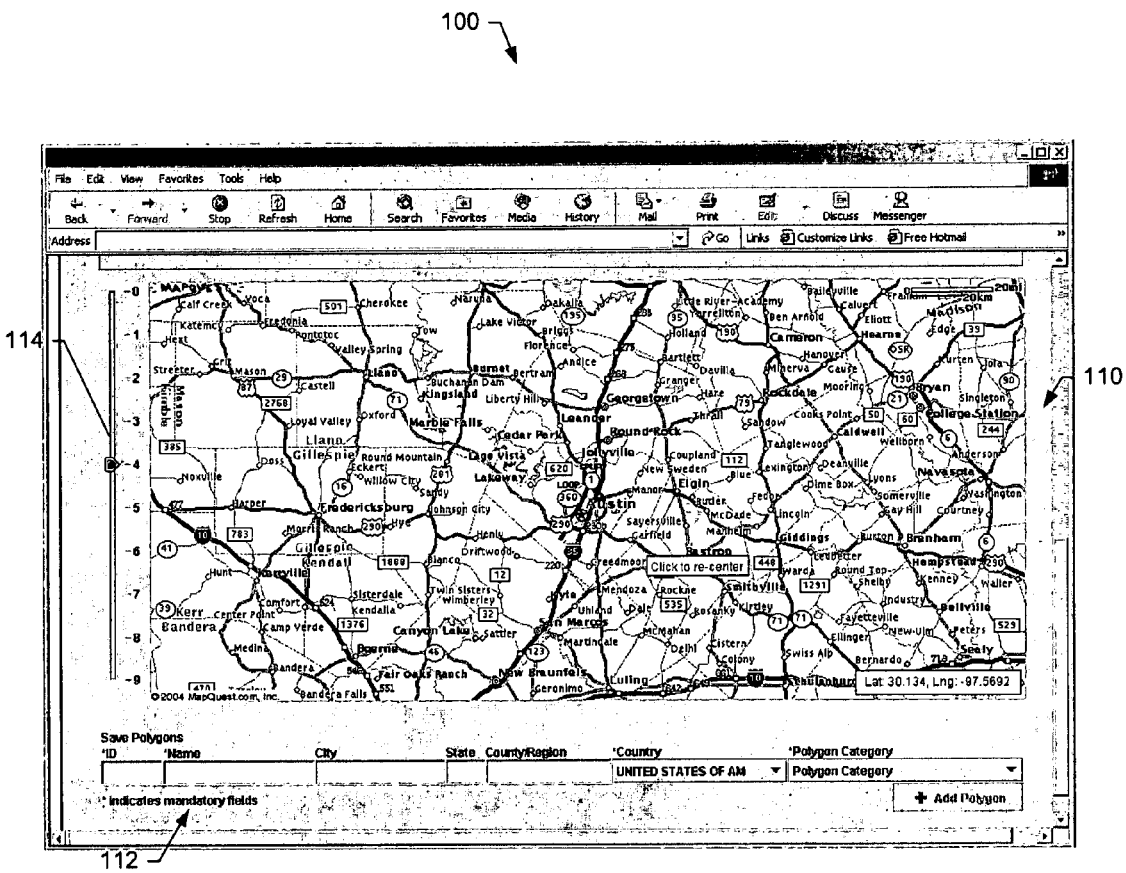

To define each AOI, the under control of the administrator, the JavaApplet™ displays, in window portion 110, a map of a geographic area including a desired AOI (see FIG. 4, block 56). As shown in FIG. 9, for example, window portion 110 displays a map of the United States, although the window portion can display a map of any geographic area including a desired AOI. In window portion 110, as explained above, the map may be manipulated to more clearly present a desired AOI. For example, the JavaApplet™ may be directed to re-center the map about a desired AOI, and/or zoom into the desired AOI to more clearly present the desired AOI. More particularly, for example, the JavaApplet™ can be directed to re-center the map about a desired AOI by placing a movable pointer over the map in the area about the AOI and clicking a button of a mouse (i.e., user input interface) of the administrator computer system, such as shown in the display of FIG. 10 re-centering the map about Austin, Tex. The map can also be zoomed to a desired zoom level of the map by positioning the pointer over the desired zoom level on a sliding zoom scale 114 and clicking the button of the mouse, such as shown in the display of FIG. 11 zooming the map of FIG. 10 from a zoom level of three to a zoom level of four. The map can also be re-centered about a desired AOI by placing the pointer over the map in the area about the AOI and clicking the button of the mouse, the JavaApplet™ thereby being directed to center the map about the position of the pointer when the button was clicked.

After the map of the geographic area including the desired AOI is displayed in window portion 110, the administrator 14 selects, and the JavaApplet™ receives a selection of, a type of AOI, in this case either a polygon AOI (polygon) or a circle AOI (radius), in window portion 104 (see block 58). For a polygon AOI, the radial button "inside" may be selected. Otherwise, for a circle AOI, the button "within" may be selected and a radial distance specified in a text field, or alternatively, a radial distance may be specified with the "within" button automatically being selected upon text being entered into the respective text field.

Figure 12:
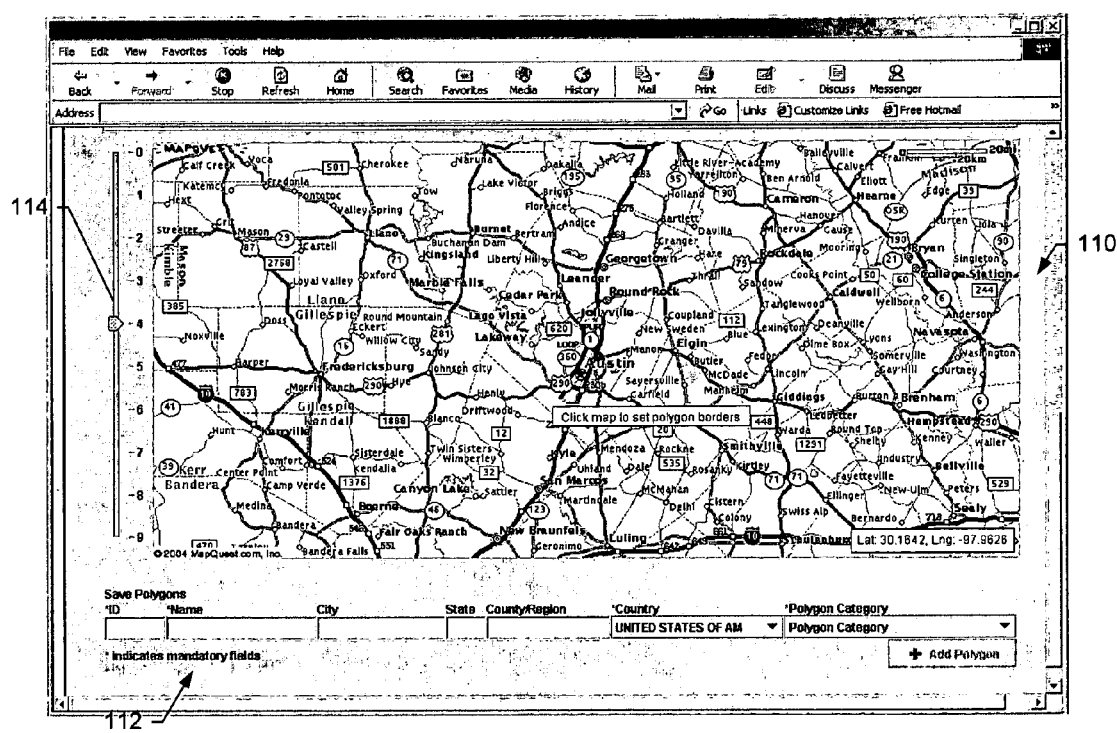
Figure 13:
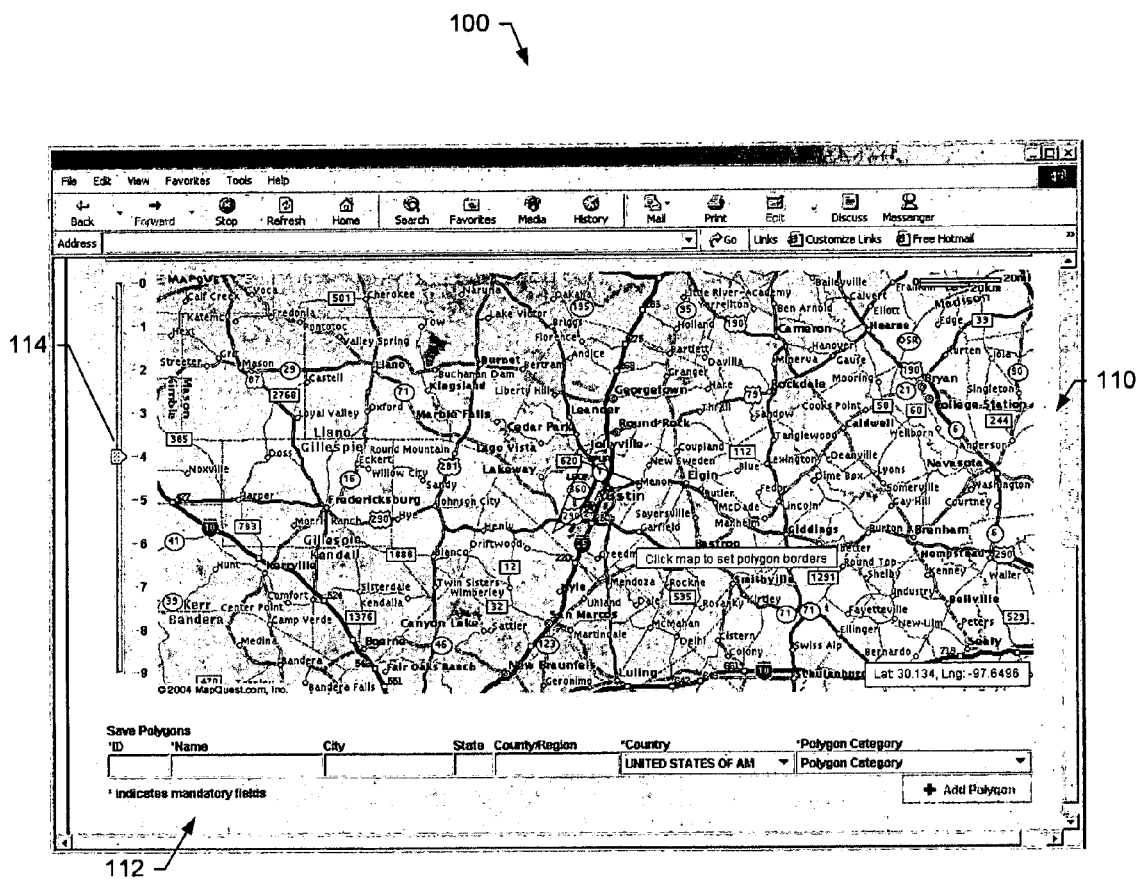
Figure 14:
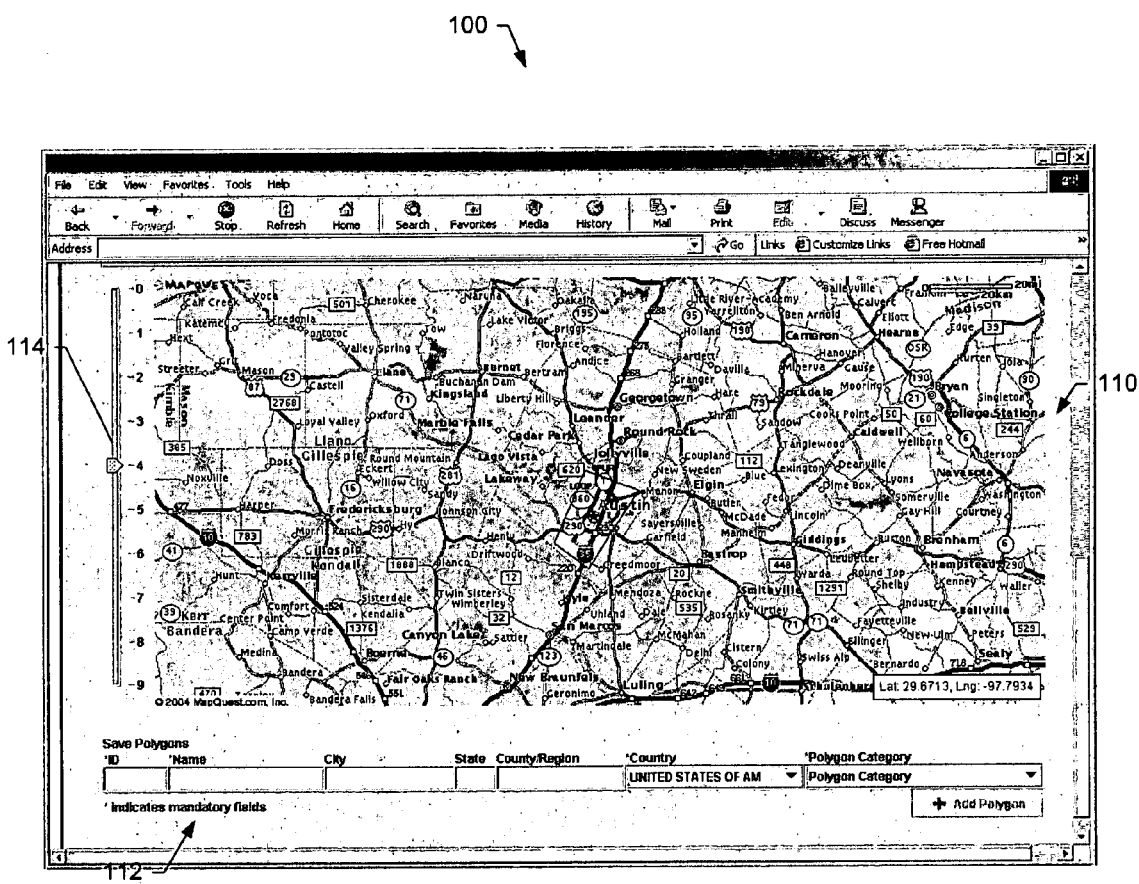

For a polygon AOI, after selecting the "inside' radial button, the administrator 14 selects, and the JavaApplet™ receives a selection of, the "polygon" button in window portion 104. Then, scrolling down to window portion 110, the administrator can select the points of a polygon to thereby define the polygon AOI (see block 60). More particularly, the administrator can direct a pointer over the geographic map displayed in window portion 110 to a position on the map corresponding to the first point of the polygon, the JavaApplet™ overlaying the instruction "click map to set polygon borders" proximate the pointer, as shown in the display of FIG. 12. Once the pointer is directed to the first point on the map, the mouse button can be clicked to select the first point of the polygon AOI. For each subsequent point of the polygon AOI, then, the pointer is redirected to the respective point, and the mouse button is clicked to select the respective point. Between each subsequent point and the previously selected point, the JavaApplet™ can draw or otherwise overlay a side of the polygon over the map, thereby indicating the defined sides of the polygon AOI, such as to the administrator, as shown in the display of FIGS. 13 and 14. Then, to close the polygon, the pointer is directed back to the first point on the map, and the mouse button clicked. Alternatively, as each subsequent point of the polygon AOI is selected, the JavaApplet™ may function as though the subsequent point is the last point such that the pointer need not be directed back to the first point to close the polygon.

Figure 15:
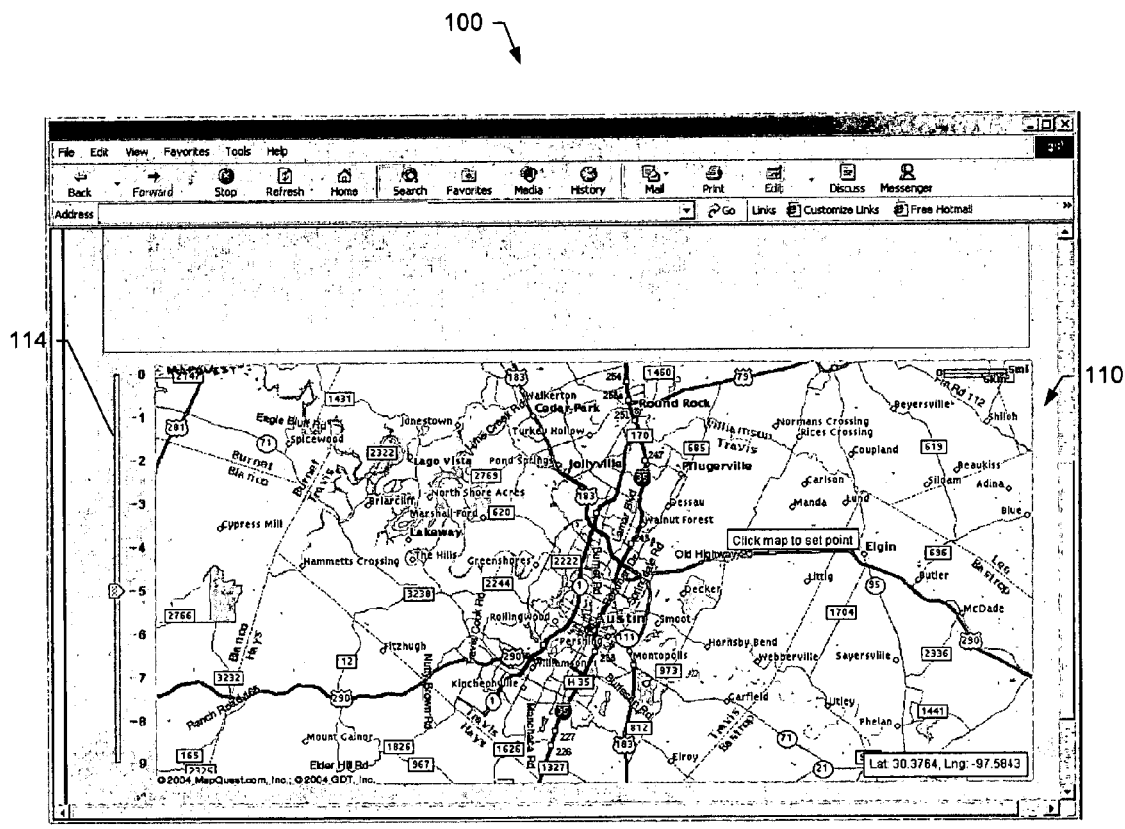
Figure 16:
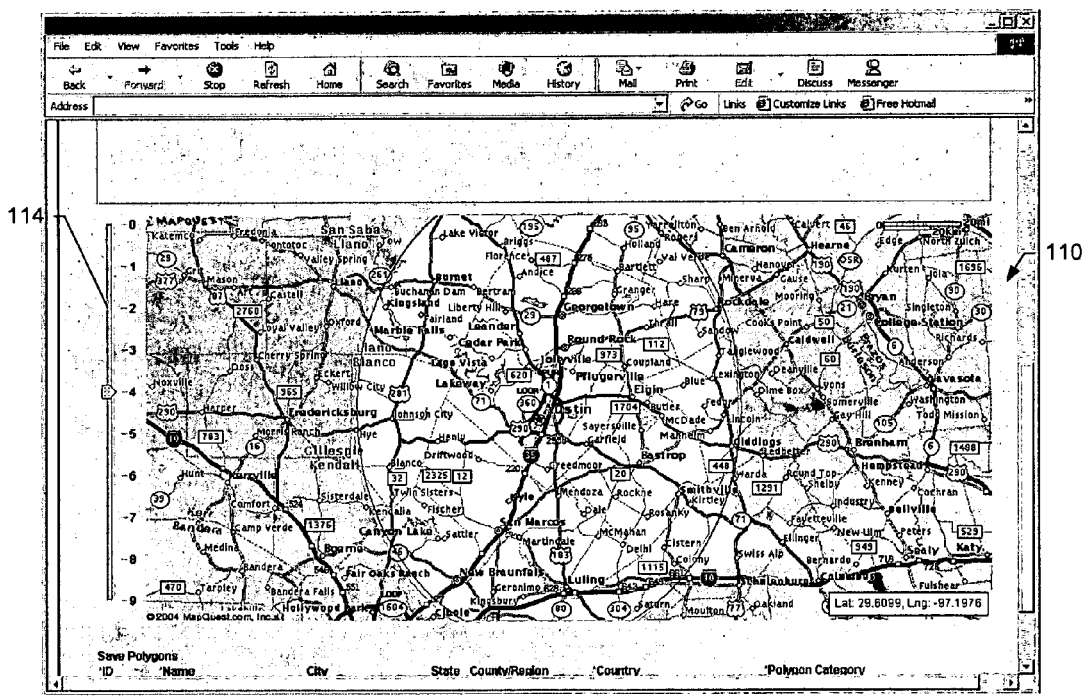

For a circle AOI, after selecting the "within" button and specifying a radial distance, the administrator 14 selects, and the JavaApplet™ receives a selection of, the "point" button in window portion 104. Then, similar to selecting the first point of a polygon POI, scrolling down to window portion 110, the administrator can select the center reference point of a circle to thereby define the circle AOI based upon the center reference point and the radial distance (see block 60). More particularly, the administrator can direct a pointer over the geographic map displayed in window portion 110 to a position on the map corresponding to the center reference point of the circle, the JavaApplet™ overlaying the instruction "click map to set point" proximate the pointer, as shown in the display of FIG. 15. Once the pointer is directed to the center reference point on the map, the mouse button can be clicked to select the center reference point of the circle AOI which, when combined with the specified radial distance, define a circle AOI, as shown in FIG. 16.

Advantageously, the JavaApplet™ may respond to selecting points of a polygon POI, or selecting the center reference point of a circle POI, by displaying or otherwise indicating the AOI on the map in window portion 114 as the AOI is defined. More particularly, the JavaApplet™ may present the AOI as a shaded overlay of the map in window 114, the shaded overlay changing with each selected point to illustrate the AOI as the AOI is defined. Alternatively, as shown in FIGS. 13, 14 and 16, the JavaApplet™ may present the AOI by shading the area around the AOI. The administrator can thus view the point(s) defining the AOI, as well as the area of the map located within the defined AOI, as and after the AOI is defined.

After defining the AOI, the administrator 14 may direct the JavaApplet™ to store the AOI, such as in an AOI record in a database 30 in memory 24 of the administrator computer system (see block 62). To store the AOI, the administrator may scroll to window portion 112 of the JavaApplet™ GUI, the illustrated window portion 112 being specifically configured to store polygon AOIs. Thereafter, the administrator may enter or otherwise select information that may later be used to identify the AOI within the database. As shown, for example, the administrator may enter or select an ID, name, country and granular (polygon) category (e.g., MSA, area, neighborhood, valley, etc.) for the AOI, the information being entered into respective text fields or selected from respective drop-down menus. Additionally, if so desired, the administrator may enter a geographic city, state and/or county/region into respective text fields. After entering/selecting information identifying the AOI, the administrator can select the "add polygon" button to thereby direct the JavaApplet™ to store the defined AOI, along with the identifying information, in the database.

In addition to defining and storing AOIs, the JavaApplet™ may also be adapted to identify desired POIs within a defined AOI. To identify desired POIs within a defined AOI, the administrator 14 selects an AOI within which to search for the POIs. The AOI may be selected as a just-defined AOI currently displayed in window portion 110, or from among previously stored AOIs (see block 66). In this regard, to select an AOI from previously stored AOIs, the administrator may scroll to window portion 102. Then, the administrator may enter or otherwise select one or more pieces of information identifying a particular AOI within a respective database 30 stored in memory 24 of the administrator, one or more of these pieces of information previously entered/selected to store the respective AOI. As shown, for example, the administrator may select a stored AOI by entering or selecting an ID, name, country and granular (polygon) category (e.g., MSA, area, neighborhood, valley, etc.) for the respective AOI, the information again being entered into respective text fields or selected from respective drop-down menus. Additionally, if so desired, the administrator may enter a geographic city, state and/or county/region into respective text fields of window portion 102. Additionally, because an AOI may be located within another AOI of a larger granularity, the administrator may further select the granular category of the larger AOI (the desired AOI being related to the "polygon subcategory" and the larger AOI, within which the desired AOI is located, being related to the "polygon category").

Then, having entered/selected information identifying a desired AOI to select from the database 30 stored in memory 24 of the administrator 14, the administrator can select the "search" button to thereby direct the JavaApplet™ to search the database for an AOI having the respective identifying information. If the database includes only one AOI having the respective identifying information, that AOI may be selected. Otherwise, in various instances the database may include more than one AOI having the respective identifying information, such as may be the case when one or more of the available pieces of identifying information are not otherwise entered/selected by the administrator. In such instances, the JavaApplet™ may list the AOIs having the respective identifying information in window portion 108. From the listed AOIs, then, the administrator may select a desired AOI. Irrespective of how the AOI is selected, however, the JavaApplet™ may thereafter display or otherwise indicate the selected AOI on the map in window portion 114. More particularly, as before, the JavaApplet™ may present the defined AOI as a shaded overlay of the map in window 114.

Figure 17:
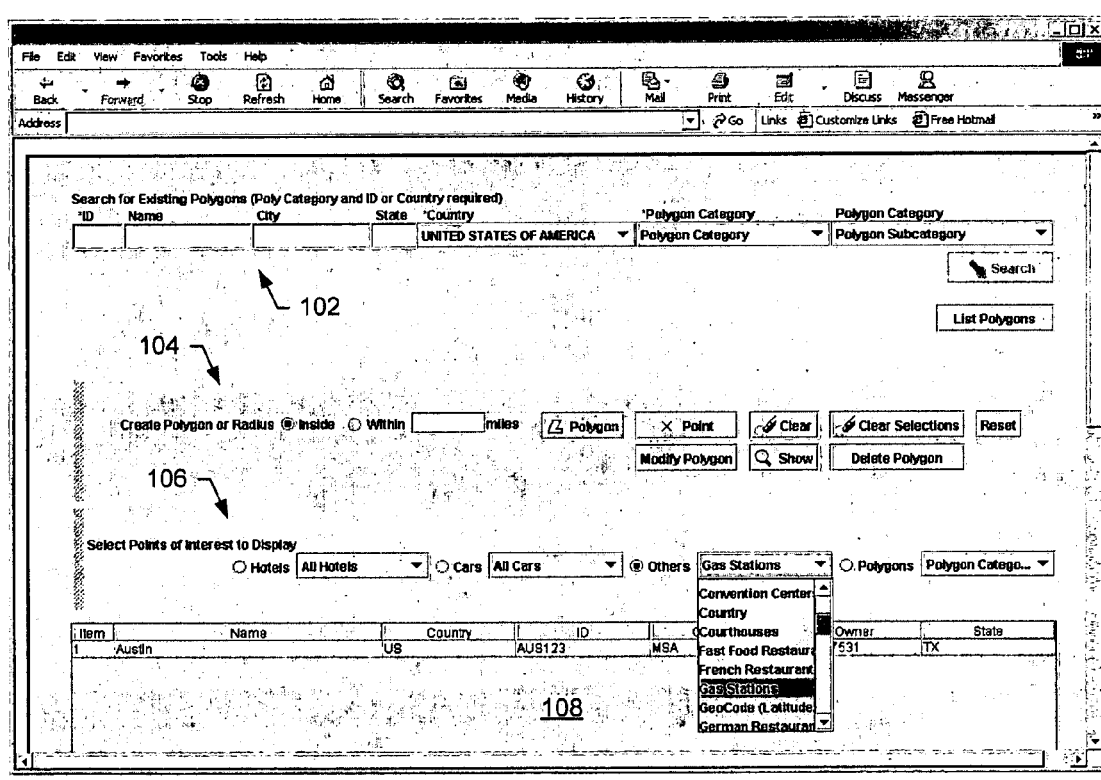

Along with selecting an AOI, the administrator 14 selects desired POIs to search for within the selected AOI. To select POIs, the administrator selects a POI type category (POI characteristic) from drop-down menus presented in window portion 106. As shown, for example, hotel POIs may be selected by selecting the "hotels" button, car rental center POIs may be selected by selecting the "cars' button, and other POI type categories (e.g., gas stations) may be selected by selecting the "others" button, as shown in the display of FIG. 17. Further, within various type categories such as hotels and cars, a type sub-category may be selected, such as from a drop-down menu. As explained above, these type sub-categories may include, for example, a particular commercial business or chain of businesses associated with the respective POI (e.g., Marriott hotels, Hertz can rental centers, etc.).

After selecting an AOI and POI type category, the administrator may select the "show" button from window portion 104 to direct the JavaApplet™ to search for POIs that have the selected type category and are located within the selected AOI (see block 68). Thereafter, the JavaApplet™ (via the Web browser within which the JavaApplet™ operates) sends the AOI definition (e.g., geo-code points defining a polygon AOI) of the selected AOI, and the selected POI type category, to an information provider 12. In response to receiving the AOI definition and selected POI type category, the information provider searches their POI records 32 in databases stored in memory 24 of the information providers to identify POIs having the selected type category and a location within the bounds of the selected AOI, as such may be determined based upon the definition of the selected AOI. The AOI and POI are then displayed on a map to the user.

Figure 18:
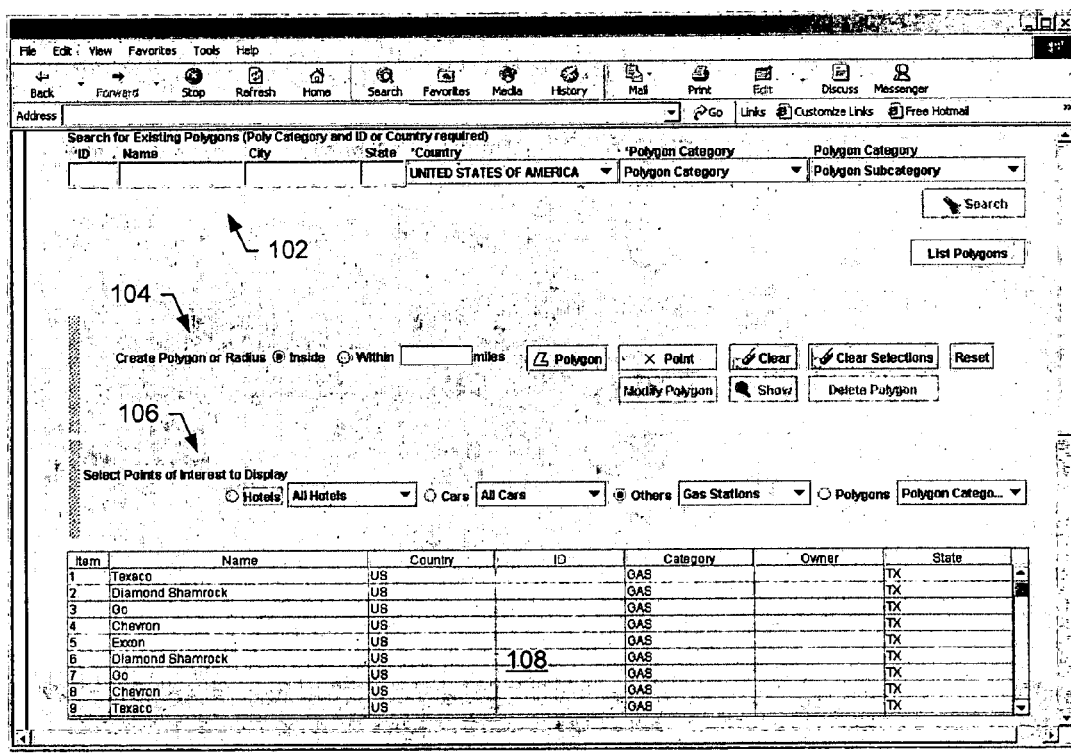
Figure 19:
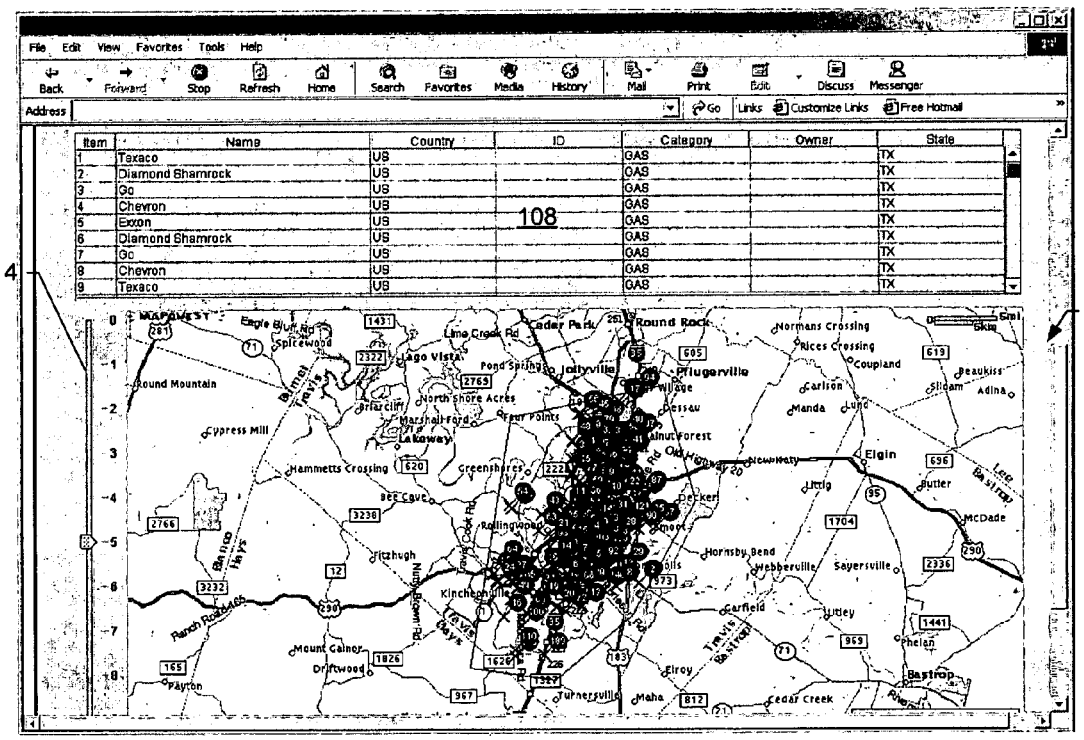
Figure 20:
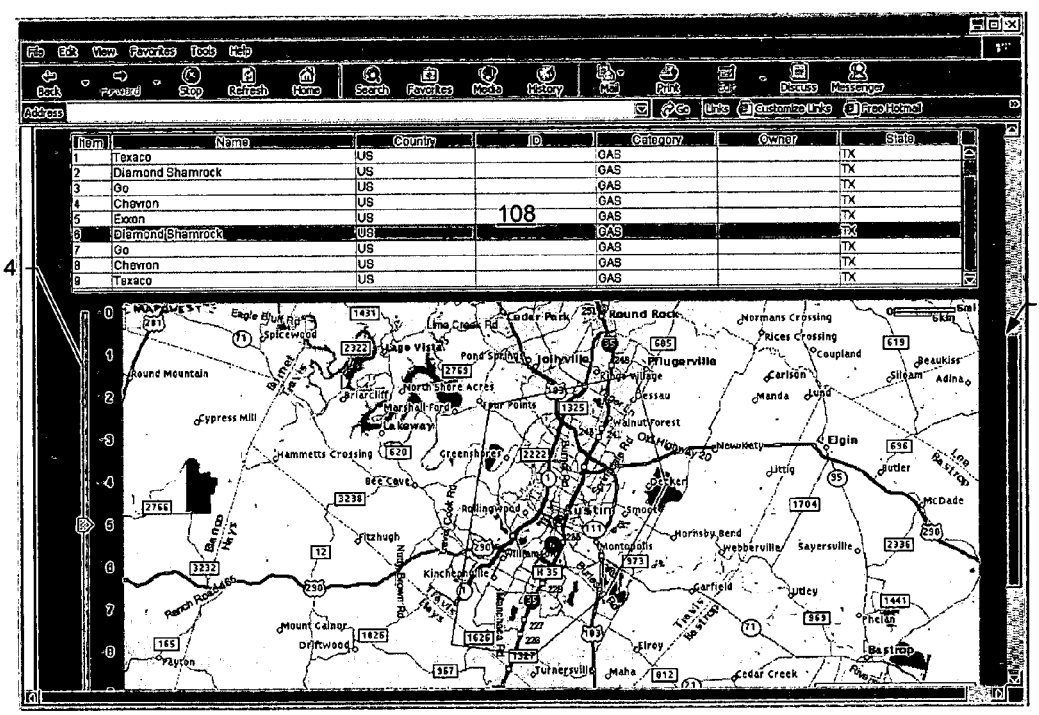

After identifying the desired POIs having the selected type category and located within the selected AOI, the information provider 12 returns, to the JavaApplet™, a listing of the respective POIs (see block 70). Then, after receiving the listing, the JavaApplet™ may display the listing of POIs in window portion 108, such as in a numbered list, as shown in the display of FIG. 18. In addition, the JavaApplet™ may identify the respective POIs on the map displayed in window portion 110. In such instances, the JavaApplet™ may identify the POIs by numbers corresponding to the numbers of the POI in a numbered list displayed in window portion 108, as shown in the display of FIG. 19. From the listed POIs, the administrator 14 may select a desired POI. The selected POI may then be highlighted on the map displayed in window portion 110, such as by only identifying the number of the selected POI, as shown in the display of FIG. 20, and/or by causing the number identifying the selected POI to blink. Also after receiving the listing, the administrator may store the listing, such as in a search record for the selected POI type category, the search record being stored in a database 30 in memory 24 of the administrator computer system (see block 72).

Figure 21:
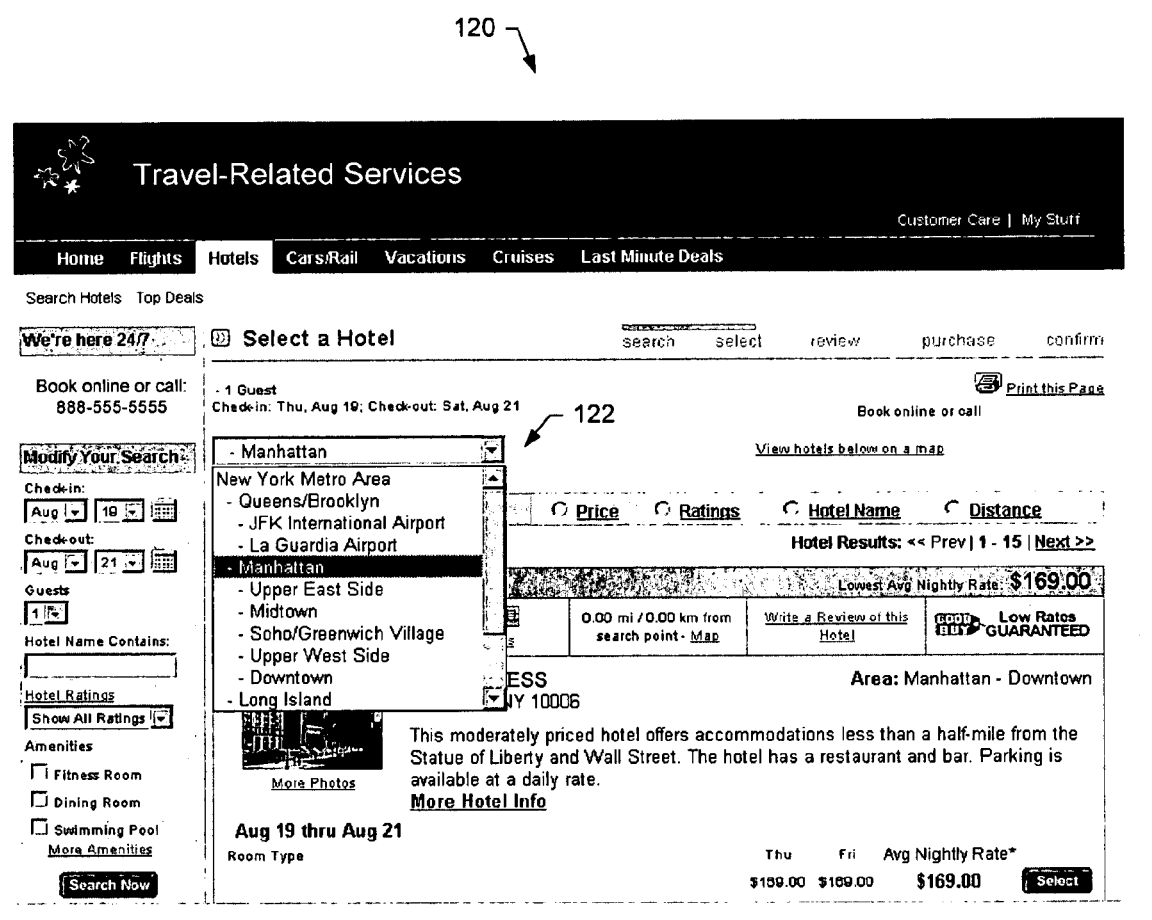

After a service provider 16 receives a search record 36 from the administrator 14, ranks the POIs listed in the search record and organizes the listed POIs in accordance with their ranking, the service provider makes a Web page available to the client across the network(s) 20. A client can then download or otherwise receive the Web page, and display the Web page in a client application, such as a conventional Web browser. Such a Web page 120 illustrating travel-related services provided by a service provider is shown in FIG. 21. More particularly, from the illustrated Web page, a client may select a POI type category for which to receive information, and select an AOI within which to search for POIs of the selected type category. As shown, for example, the POI type category hotels may be selected by selecting the "hotels" link to thereby drive the Web browser to request, and thereafter receive and display, a Web page related to hotels. From the Web page related to hotels, then, the client may select an AOI, such as by name, from a drop-down menu 122 displayed in the Web page. For example, as shown, the client may select the AOI for "Manhattan," which represents an area within the greater MSA AOI "New York Metro Area."

After receiving the client's 18 selection of a POI type category and AOI, the Web browser may be directed by the client to send an inquiry to the service provider 16 to request POI information related to POIs having the selected type category and located within the selected AOI (see FIG. 7, block 82). Upon receiving the inquiry, the service provider may identify a ranked search record 40 for the selected POI type category (see block 84). From the ranked POIs in the identified, ranked search record, the service provider determines those POIs that are located within the selected AOI (see block 86). The service provider then accesses the database of POI information 40 in memory of the service provider to retrieve information relating to those POIs in the identified search record that are located within the selected AOI (see block 88). For example, the service provider may access a search record for "hotels" and determine those POIs located within the "Manhattan" AOI.

Figure 22:

In response to the inquiry, then, the service provider 14 may provide the client 18 with a Web page including those POIs having the selected type category and located in the selected AOI, the POIs being presented in their ranked order from the respective search record (see blocks 90 and 92). For example, the service provider may provide the client with a Web page including the hotels located within Manhattan in order of a quality ranking 124, one of which is shown in the display of FIG. 22. In addition, the service provider may include, on the Web page, one or more pieces of POI information associated with the respective POIs. As shown, for example, the service provider may include hotel information such as amenities, location and room pricing information. In addition to presenting the listing of ranked POIs, the Web browser may be adapted to display a geographic map identifying the locations of one or more of the POIs and/or the previously selected AOI within which the POIs are located. As shown, for example, the client may select link 126 identified as "view hotels below on a map," which may then direct the Web browser to display a map of an area including the selected AOI, and identify the ranked POIs, as shown in FIG. 23.

As indicated above, in various instances, the POI information may include information relating to purchasing and/or reserving goods and/or services offered by the POI. In this regard, as shown with respect to hotels, the Web page may include POI information relating to pricing and availability of one or more rooms of the hotels, for one or more specified nights and one or more specified persons. In addition, the Web page may include a link 128 (e.g., "select"), which the client may select to request/receive another Web page including an on-line form from which one or more rooms at the hotel can be booked or otherwise reserved for the specified number of nights and persons.

As explained above the information provider 12, administrator 14 and service provider 16 generate and/or maintain a number of different records and information, including POI records 32, AOI records 34, search records 36, ranked search records 38 and POI information 40. And as also explained above, various ones of the records and information may include or otherwise be based upon various other ones of the records and information. Thus, as will be appreciated, in various instances, one or more of the aforementioned records and information may not be maintained by a respective entity, but may instead be generated as a specific record and/or information is requested or otherwise required. For example, in lieu of storing ranked search records, the service provider may instead download a search record and rank the POIs within the search record after the service provider receives a request for POIs included in the respective search record.

As will also be appreciated, over time, information included in one or more of the POI records 32, AOI records 34, search records 36, ranked search records 38 and POI information 40 may change or otherwise be updated. Thus, at one or more instances after generating a respective record or information, the entity maintaining the record or information in a database 30 in memory 24 of the entity may be configured to update the record or information, such as in the same manner the record or information was previously generated. The updating can occur in any of a number of different manners, such as at regular or irregular time intervals or otherwise as requested by the respective entities or one or more other entities receiving at least a portion of the record or information.

As also explained above, the administrator 14 defines the AOIs within which a user 18 subsequently selects to search within for POIs. It should be understood, however, that the user may alternatively select one or more AOIs within which the user searches for POIs. In such instances, the user may be adapted to define an AOI, and send the AOI definition and POI characteristic(s) (e.g., POI type category) to a service provider 16 in communication with an administrator, or send the AOI and POI characteristic(s) directly to an administrator. In response, the administrator could generate a search record associated with the POI characteristic(s), the search record including POIs that have the selected characteristic(s) and are located within the defined AOI, such as in the same manner as before. Also, the service provider could rank and organize the POIs in the search record, as before, and provide the ranked POIs and associated POI information to the user. Thus, as before, the user may request and thereafter receive information related to POIs that have POI characteristics and are located within an AOI, the POI characteristic(s) and AOI both being selected by the user.

Further, as explained above, the user 18 requests and receives information related to POIs that have selected characteristic(s) and are located within a selected AOI. Alternatively, the user may be capable of requesting and receiving information related to POIs that have characteristics(s) the same as a selected POI, and that are located within a same AOI as the selected POI. In such instances, the user may select a POI having one or more characteristics (e.g., POI type category) and an identifiable location. Based upon the characteristics and the location of the POI, the service provider 16 or administrator 14 can determine an AOI within which the selected POI is located. In various instances, however, the selected POI may be located within more than one AOI. In such instances, the user may be presented with a listing of the AOIs within which the POI is located such that the user may select an AOI. Alternatively, a default AOI may be selected from the AOIs within which the POI is located, such as the AOI having the smallest granularity, and if more than one AOI have the smallest granularity, the AOI that further has the greater distance between the AOI and the boundary of the AOI located the closest to the POI. Irrespective of how the AOI is determined (and selected if more than one AOI is determined), based upon the characteristic(s) and the determined AOI, the method can then proceed as before, with the user receiving information relating to POIs that have characteristics the same as the selected POI, and are located within the same AOI as the selected POI.

According to one aspect of the present invention, all or a portion of the system 10 of the present invention, such as all or portions of the administrator 12 and/or client 14 generally operates under control of a computer program product (e.g., applications 26). The computer program product for performing the methods of exemplary embodiments of the present invention includes a computer-readable storage medium, such as the non-volatile storage medium, and computer-readable program code portions, such as a series of computer instructions, embodied in the computer-readable storage medium.

In this regard, FIGS. 3-7 are flowcharts of methods, systems and program products according to exemplary embodiments of the present invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that each block or step of the flowcharts, and combinations of block(s) or step(s) in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for performing a method of searching and retrieving ranked points of interest (POIs) within a Polygonal area of interest (AOI), wherein the system comprises at least one processing element for at least one of performing or facilitating performance of the method, the method comprising:

defining an AOI representing a geographic area, the AOI having a Polygon shape including a plurality of points defining the geographic area of the AOI;

identifying at least one geographic POI located within the defined AOI; and organizing the identified POIs in an order of rankings pre-associated with the identified POIs, the POIs being organized such that information related to at least some of the identified POIs is capable of being requested and thereafter presented in the order of the rankings pre-associated with the respective POIs.

2. A system according to claim 1, wherein the defining step comprises:
presenting a map of a geographic area;
selecting, on the map, a plurality of points defining an AOI; and
presenting at least a portion of the AOI after selecting each of at least some of the points, the portion of the AOI being presented as a shaded overlay of the map, the shaded overlay capable of changing with selection of at least some of the points as the AOI is being defined.

3. A system according to claim 1, wherein the identifying step comprises:
selecting at least one characteristic of at least one POI; and
searching for at least one POI having the selected characteristics and a location within the AOI to thereby identify at least one POI within the defined AOI, a location within the defined AOI being determinable based upon the plurality of points defining the AOI.

4. A system according to claim 3, wherein the defining step comprises defining two or more AOIs, and wherein the identifying step further comprises selecting an AOI within which to search for at least one POI before searching for at least one POI.

5. A system according to claim 3, wherein the searching step comprises sending the selected characteristics and a plurality of points defining the AOI across at least one network to an information provider, the information provider being capable of searching two or more POI records for two or more POIs to thereby identify at least one POI within the defined AOI, and capable of returning the identified POIs across the network.

6. A system according to claim 1, wherein the
organizing step comprises: organizing at least one selected POI in an order higher than rankings pre-associated with the respective selected POIs.

7. A system according to claim 1 further comprising:
generating a search record for the identified POIs; and
providing the search record to an information provider such that the service provider is thereafter capable of receiving, from a client, a request for information related to at least some of the identified POIs, searching the search record for the requested information, and sending the requested information to the client.

8. A system according to claim 7, wherein the identifying step further comprises identifying at least one POI at two or more subsequent instances, and
wherein the generating step further comprises, for at least one of the subsequent instances, updating the search record to include at least one additional POI identified during the respective subsequent instance.

9. A system according to claim 7, wherein the defining step comprises defining two or more AOIs, wherein the identifying step comprises identifying at least one POI within a defined AOI at two or more subsequent instances, wherein at least one POI is capable of being identified within two or more different AOIs, and
wherein the generating step further comprises, for at least one of the subsequent instances, updating the search record to include at least one additional AOI within which an identified POI is located during the respective subsequent instance.

10. A computer-implemented method of searching and retrieving ranked points of interest (POIs) within a Polygonal area of interest (AOI), the method comprising:
defining an AOI representing a geographic area, the AOI having a polygon shape including a plurality of points defining the geographic area of the AOI;
identifying at least one geographic POI located within the defined AOI; and
organizing the identified POIs in an order of rankings pre-associated with the identified POIs, the POIs being organized such that information related to at least some of the identified POIs is capable of being requested and thereafter presented in the order of the rankings pre-associated with the respective POIs.

11. A computer-implemented method according to claim 10, wherein the defining step comprises:
presenting a map of a geographic area;
selecting, on the map, a plurality of points defining an AOI; and
presenting at least a portion of the AOI after selecting each of at least some of the points, the portion of the AOI being presented as a shaded overlay of the map, the shaded overlay capable of changing with selection of at least some of the points as the AOI is being defined.

12. A computer-implemented method according to claim 10, wherein the identifying step comprises:
selecting at least one characteristic of at least one POI; and
searching for at least one POI having the selected characteristics and a location within the AOI to thereby identify at least one POI within the defined AOI, a location within the defined AOI being determinable based upon the plurality of points defining the AOI.

13. A computer-implemented method according to claim 12, wherein the defining step comprises defining two or more AOIs, and wherein the identifying step further comprises selecting an AOI within which to search for at least one POI before searching for at least one POI.

14. A computer-implemented method according to claim 12, wherein the searching step comprises sending the selected characteristics and a plurality of points defining the AOI across at least one network to an information provider, the information provider being capable of searching two or more POI records for two or more POIs to thereby identify at least one POI within the defined AOI, and capable of returning the identified POIs across the network.

15. A computer-implemented method according to claim 10, wherein the organizing step comprises:
organizing at least one selected POI in an order higher than rankings pre-associated with the respective selected POIs.

16. A computer-implemented method according to claim 10 further comprising:
generating a search record for the identified POIs; and
providing the search record to an information provider such that the service provider is thereafter capable of receiving, from a client, a request for information related to at least some of the identified POIs, searching the search record for the requested information, and sending the requested information to the client.

17. A computer-implemented method according to claim 16, wherein the identifying step further comprises identifying at least one POI at two or more subsequent instances, and
wherein the generating step further comprises, for at least one of the subsequent instances, updating the search record to include at least one additional POI identified during the respective subsequent instance.

18. A computer-implemented method according to claim 16, wherein the defining step comprises defining two or more AOIs, wherein the identifying step comprises identifying at least one POI within a defined AOI at two or more subsequent instances, wherein at lest one POI is capable of being identified within two or more different AOIs, and wherein the generating step further comprises, for at least one of the subsequent instances, updating the search record to include at least one additional AOI within which an identified POI is located during the respective subsequent instance.

19. A computer program product for performing a method of searching and retrieving ranked points of interest (POIs) within a polygonal area of interest (AOI), wherein the computer program product comprises at least one computer-readable storage medium having computer-readable, executable program code portions stored therein for at least one of performing and facilitating performance of the method, the method comprising:

defining an AOI representing a geographic area, the AOI having a Polygon shape including a plurality of points defining the geographic area of the AOI;

identifying at least one geographic POI located within the defined AOI; and organizing the identified POIs in an order of rankings pre-associated with the identified POIs, the POIs being organized such that information related to at least some of the identified POIs is capable of being requested and thereafter presented in the order of the rankings pre-associated with the respective POIs.

20. A computer program product according to claim 19, wherein the defining step comprises:

presenting a map of a geographic area;

selecting, on the map, a plurality of points defining an AOI; and presenting at least a portion of the AOI after selecting each of at least some of the points, the portion of the AOI being presented as a shaded overlay of the map, the shaded overlay capable of changing with selection of at least some of the points as the AOI is being defined.

21. A computer program product according to claim 19, wherein the identifying step comprises:

selecting at least one characteristic of at least one POI; and searching for at least one POI having the selected characteristics and a location within the AOI to thereby identify at least one POI within the defined AOI, a location within the defined AOI being determinable based upon the plurality of points defining the AOI.

22. A computer program product according to claim 21, wherein the defining step comprises defining two or more AOIs, and wherein the identifying step further comprises selecting an AOI within which to search for at least one POI before searching for at least one POI.

23. A computer program product according to claim 21, wherein the searching step comprises sending the selected characteristics and a plurality of points defining the AOI across at least one network to an information provider, the information provider being capable of searching two or more POI records for two or more POIs to thereby identify at least one POI within the defined AOI, and capable of returning the identified POIs across the network.

24. A computer program product according to claim 19, wherein the organizing step comprises:

organizing at least one selected POI in an order higher than rankings pre-associated with the respective selected POIs.

25. A computer program product according to claim 19 further comprising:

generating a search record for the identified POIs; and providing the search record to an information provider such that the service provider is thereafter capable of receiving, from a client, a request for information related to at least some of the identified POIs, searching the search record for the requested information, and sending the requested information to the client.

26. A computer program product according to claim 25, wherein the identifying step further comprises identifying at least one POI at two or more subsequent instances, and wherein the generating step further comprises, for at least one of the subsequent instances, updating the search record to include at least one additional POI identified during the respective subsequent instance.

27. A computer program product according to claim 25, wherein the defining step comprises defining two or more AOIs, wherein the identifying step comprises identifying at least one POI within a defined AOI at two or more subsequent instances, wherein at lest one POI is capable of being identified within two or more different AOIs, and wherein the generating step further comprises, for at least one of the subsequent instances, updating the search record to include at least one additional AOI within which an identified POI is located during the respective subsequent instance.

* * * * *